United States Patent
Perkins et al.

(10) Patent No.: US 7,751,713 B2
(45) Date of Patent: Jul. 6, 2010

(54) COMMUNICATION NETWORK WITH SKEW PATH MONITORING AND ADJUSTMENT

(75) Inventors: Drew D. Perkins, Saratoga, CA (US); David F. Welch, Menlo Park, CA (US); Ting-Kuang Chiang, Saratoga, CA (US); Charles H. Joyner, Sunnyvale, CA (US); Edward E. Sprague, Woodside, CA (US); Parthiban Kandappan, San Jose, CA (US); Stephen G. Grubb, Ellicott City, MD (US); Biao Lu, Cupertino, CA (US); Prasad Paranjape, Fremont, CA (US)

(73) Assignee: Infinera Corporation, Sunnyvale, CA (US)

( * ) Notice: Subject to any disclaimer, the term of this patent is extended or adjusted under 35 U.S.C. 154(b) by 518 days.

(21) Appl. No.: 11/781,912

(22) Filed: Jul. 23, 2007

(65) Prior Publication Data

US 2008/0175590 A1    Jul. 24, 2008

Related U.S. Application Data

(60) Provisional application No. 60/885,832, filed on Jan. 19, 2007.

(51) Int. Cl.
H04J 14/00 (2006.01)
H04J 14/02 (2006.01)
H04B 10/12 (2006.01)
H04B 10/00 (2006.01)

(52) U.S. Cl. ............... 398/81; 398/45; 398/147; 398/158

(58) Field of Classification Search ........... 398/25–27, 398/29, 33, 58, 66, 68, 74, 81, 147, 158, 398/177
See application file for complete search history.

(56) References Cited

U.S. PATENT DOCUMENTS

| 7,000,158 B2 * | 2/2006 | Goyal et al. ............... 714/715 |
| 7,120,356 B2 * | 10/2006 | Graves et al. ............... 398/9 |
| 7,149,432 B1 * | 12/2006 | Smith et al. ............... 398/158 |
| 7,272,309 B1 * | 9/2007 | Tamil et al. ............... 398/47 |

* cited by examiner

Primary Examiner—Datzid Singh
(74) Attorney, Agent, or Firm—North Weber & Baugh LLP; Ross M. Carothers

(57) ABSTRACT

Embodiments of the present invention route a WDM signal across multiple communication paths using skew characteristics of at least some of the communication paths. The network is an optical transport network, using either circuit or packet based switching, and wavelength division multiplexed wavelengths and/or optical carrier groups ("OCGs") over a fiber link to another node in the network. The plurality of communication paths involves different signal and path attributes such as a plurality of carrier wavelengths, optical carrier groups, physical communication paths (different nodes, different fibers along a same path, or any combination of the foregoing), or any other differentiating factors between two paths.

41 Claims, 18 Drawing Sheets

COMMUNICATION NETWORK WITH SKEW PATH MONITORING AND ADJUSTMENT

CROSS REFERENCE TO RELATED PATENT APPLICATIONS

This application claims priority to U.S. Provisional Application Ser. No. 60/885,832, entitled "Communication Network with Skew Path Factoring," filed Jan. 19, 2007, which application is incorporated herein by reference in its entirety.

BACKGROUND

A. Technical Field

This invention relates generally to optical transport networks, and more particularly to the management of skew across a wave division multiplexed network.

B. Background of the Invention

Optical networks are able to communicate information at high data rates. The importance of maintaining the relative timing and sequence of this information being communicated is important for proper operation of such networks.

A conventional optical transport system 10 is shown in FIG. 1, with multiple intermediate nodes and routes 16 between source 12 and destination 14. Nodes n1-n6 (lower case) in a network are provided as an exemplary network with spatial diversity in the span, or segments separating nodes, e.g., across a geographic area. Multiple communication paths between a source node and destination node are provided across the network. The transport system might consider the route length, the traffic load, the route cost, and latency property, among other factors, for a given signal when choosing a path within the network on which to transport the signal. For example, a high quality of service ("QoS") request might require a given signal be transported on a route between a source and a destination with the lowest amount of latency. Alternatively, as traffic data rates continue to mushroom, carriers typically resort to routing signals on alternative and/or relatively higher latency paths, which oftentimes span a longer overall distance than the preferred path. Additionally, these longer paths typically have more nodes, which usually translates into compromised timing properties for the signal at the receiver.

Certain optical networks may transmit a source signal in parallel over multiple paths in a network. In particular, a source client signal or data signal is demultiplexed into multiple parallel subchannels or subsignals, of lower data rates to be transmitted over a fiber. A receiver will then receive the parallel subsignals and reconstruct the source client signal at its output. Because the receiver must receive all the subsignals in order to recreate the source signal, the timing of the transmission and reception of the subsignals at the receiver is important.

Skew is one factor that is important in the timing of the transmission and reception of subsignals at the receiver. Skew may be defined as a variation relative to the initial timing of a component of a launched data signal. Skew can arise from many different causes depending upon the transmission medium over which information is communication. For example, intrachannel skew and interchannel skew can arise because different wavelength carriers propagate at different rates. In particular, a high frequency carrier signal will generally take a longer period of time to propagate along an identical length fiber as a lower frequency carrier signal.

Intrachannel skew and interchannel skew may also be generated by wavelength-dependent interactions between an optical signal and an optical fiber. In particular, the optical fiber may skew carriers differently depending on the wavelength(s) thereof. Optical fiber may have variations in refractive index, polarization mode properties, dispersion and chromatic properties, etc. These variations may generate excessive signal skew at the receiver, which translates into a delay of the source signal being reconstructed at the receiver.

Many solutions have been proposed to compensate for the skew variation between multiple parallel communication paths. One solution is to simply provide a buffer of sufficient size that allows proper re-sequencing of data in spite of a large amount of skew. In worst case scenarios, the buffer is able to provide sufficient memory that allows data to be maintained while waiting for traffic to arrive on slower paths. As optical data rates increase, the size and cost of these sufficiently larger buffers also increases.

C. Definition of Terms

Definitions of certain terms are provided below. However, other terms found within the present application may be defined within other sections or known to one of skill in the art. If used throughout this description and the drawings, the following short terms have the following meanings unless otherwise stated:

3R—Optical signal regeneration that includes signal retiming as well as signal reshaping as well as regeneration or re-amplification.

4R—Any electronic reconditioning to correct for transmission impairments other than 3R processing, such as, but not limited to, FEC encoding, decoding and re-encoding.

A/D—Add/Drop.

BMM—Band MUX Module which optically combines multiple banded wavelengths or optical signal groups together CD—Chromatic Dispersion.

Client Signals are the transmission of any form of data or information as a modulated signal over a network, whether electrically or optically.

Communication Paths include any path over which a client information signal may be transmitted, including different carrier wavelengths, optical carriers, channels, physical paths, fibers or lines, nodes, speed and data rates, transmission medium or type of transmission, skew compensating devices, and modulation.

CWDM—Coarse Wavelength Division Multiplexing—transmission of data on more than one wavelength in a given direction on a grid of spacing greater than 200 GHz.

DCE—Dispersion Compensating Elements either for CD, such as DCFs, dispersion managed solutions, frequency guiding filtering, chirped fiber Bragg gratings or dispersion slope compensation, or for PMD, such as through optical device design to achieve polarization insensitivity or equalization optical circuitry to provide distorted optical signal polarization transformation.

DCF—Dispersion Compensating Fiber.

DEMUX—Demultiplexer.

Digital OEO REGEN—an OEO REGEN that provides digital handling of channel signals including their regeneration in a digital optical network without deployment or need for analog optical components including optical fiber amplifiers.

DWDM—Dense Wavelength Division Multiplexing—transmission of data on more than one wavelength in a given direction on a grid of spacing less than or equal to 200 GHz.

EO—Electrical to Optical signal conversion (from the electrical domain into the optical domain).

LR—Long Reach.

MUX—Multiplexer.

NE—Network Element which includes network nodes or other devices located within a network.

OADM—Optical Add Drop Multiplexer.

OCG—Optical Carrier Group is a grouping of a plurality of optical carrier wavelengths.

OE—Optical to Electrical signal conversion (from the optical domain into the electrical domain).

OEO—Optical to Electrical to Optical signal conversion (from the optical domain into the electrical domain with electrical signal regeneration and then converted back into optical domain) and also sometimes referred to as SONET regenerators.

OEO REGEN—OEO signal REGEN is OEO conversion wherein the signal is regenerated in the electronic domain between conversions to the optical domain. SONET regenerators are one example of OEO REGEN but it is not limited to such regenerators.

OO—Optical to Optical signal conversion (receiving in the optical domain, processing in the optical domain, and transmitting in the optical domain, without conversion of the signal to the electrical domain).

OSC—Optical supervisory channel; a physical carrier outside of the amplifier band that provides transport of the OTM Overhead Signal.

PIC—Photonic Integrated Circuit.

Rx—Receiver, here in reference to optical channel receivers.

RxPIC—Receiver Photonic Integrated Circuit.

SDM—Space Division Multiplexing.

Signal regeneration (regenerating)—Also, may be referred to as signal rejuvenation. This may entail 1R, 2R, 3R or 4R and in a broader sense signal A/D multiplexing, switching, routing, grooming, wavelength conversion as discussed, for example, in the book entitled, "Optical Networks" by Rajiv Ramaswami and Kumar N. Sivarajan, Second Edition, Morgan Kaufmann Publishers, 2002.

Skew Adjustment includes any modification of a skew of a data signal, including preskew, skew correction, skew reduction, skew matching, skew modification, or skew rehabilitation.

SR—Short Reach.

TDM—Time Division Multiplexing.

Tx—Transmitter, here in reference to optical channel transmitters.

TxPIC—Transmitter Photonic Integrated Circuit.

VSW—Virtual Super Wavelength—(a.k.a. super lambda)—a group of co-routed channels whose associated data comprise the complete client signal and whose data is needed at the egress from the network to reconstruct the client signal.

VWG—Virtual Wavelength group—one or more co-routed channels forming a portion of a VSW WDM—Wavelength Division Multiplexing—transmission of data on more than one wavelength in a given direction.

SUMMARY OF THE INVENTION

Embodiments of the present invention route a WDM signal across multiple communication paths using skew characteristics of at least some of the communication paths. The network is an optical transport network, using either circuit or packet based switching, and wavelength division multiplexed wavelengths and/or optical carrier groups ("OCGs") over a fiber link to another node in the network. The plurality of communication paths involves different signal and path attributes such as a plurality of carrier wavelengths, optical carrier groups, physical communication paths (different nodes, different fibers along a same path, or any combination of the foregoing), or any other differentiating factors between two paths.

The information transmitted over the network is associated signal data whose timing via the multiple communication paths satisfies a timing threshold at the receiver. In other words, the portions of the information should arrive at the destination node within a relative finite period of time for the original data signal to be efficiently reassembled at the receiver. Excessive delays on one or more of the paths may cause a loss of data because of the limited amount of buffer memory to store the portion of the information already at the receiver.

In certain embodiments of the invention, communication paths are selected relative to an analysis of skew on one or more of the selected communication paths and corresponding wavelengths. The associated information is routed on a path or paths with a minimum skew so that the sequential arrival of the information at a receiver is improved. Accordingly, the transmission of the associated information on the communication path(s) is controlled so that reassembly of the information becomes more efficient due to the relative arrival of portions of the information from a network to the receiver. The transmission of the associated information may be done as a virtual super wavelength or as a plurality of super wavelength groups.

In certain other embodiments of the invention, a path with a preferred minimum skew is not available and an alternate routing is performed. In these embodiments, the skew of the signal is adjusted in different communication paths using procedures such as translating a carrier frequency to a higher or lower frequency (with different skew properties), translating the signal to a different optical channel group (OCG), changing the nodal routing, and choosing from multiple fibers with different dispersion compensating properties to best match the intended goals of skew adjustment.

A skew adjustment apparatus and procedure may include electronic or optical buffers at nodes, such as buffer memory or ring oscillators. The system may be controlled by a centralized network controller, by a local controller and/or combination thereof, which may calculate, test, and establish a circuit or path. One skilled in the art would recognize that these controllers may be located anywhere within the network and provide numerous types of functionality including network installation and configuration relative to skew, skew management, skew detection, and fail-over/protection switching. These controllers may also provide dynamic feedback and control of the routing or skew adjusting methods and apparatus to provide beneficial network operation.

Other objects and attainments together with a fuller understanding of the invention will become apparent and appreciated by referring to the following description and claims taken in conjunction with the accompanying drawings.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

The following description is set forth for purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures shown below in the diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

Figure 2:
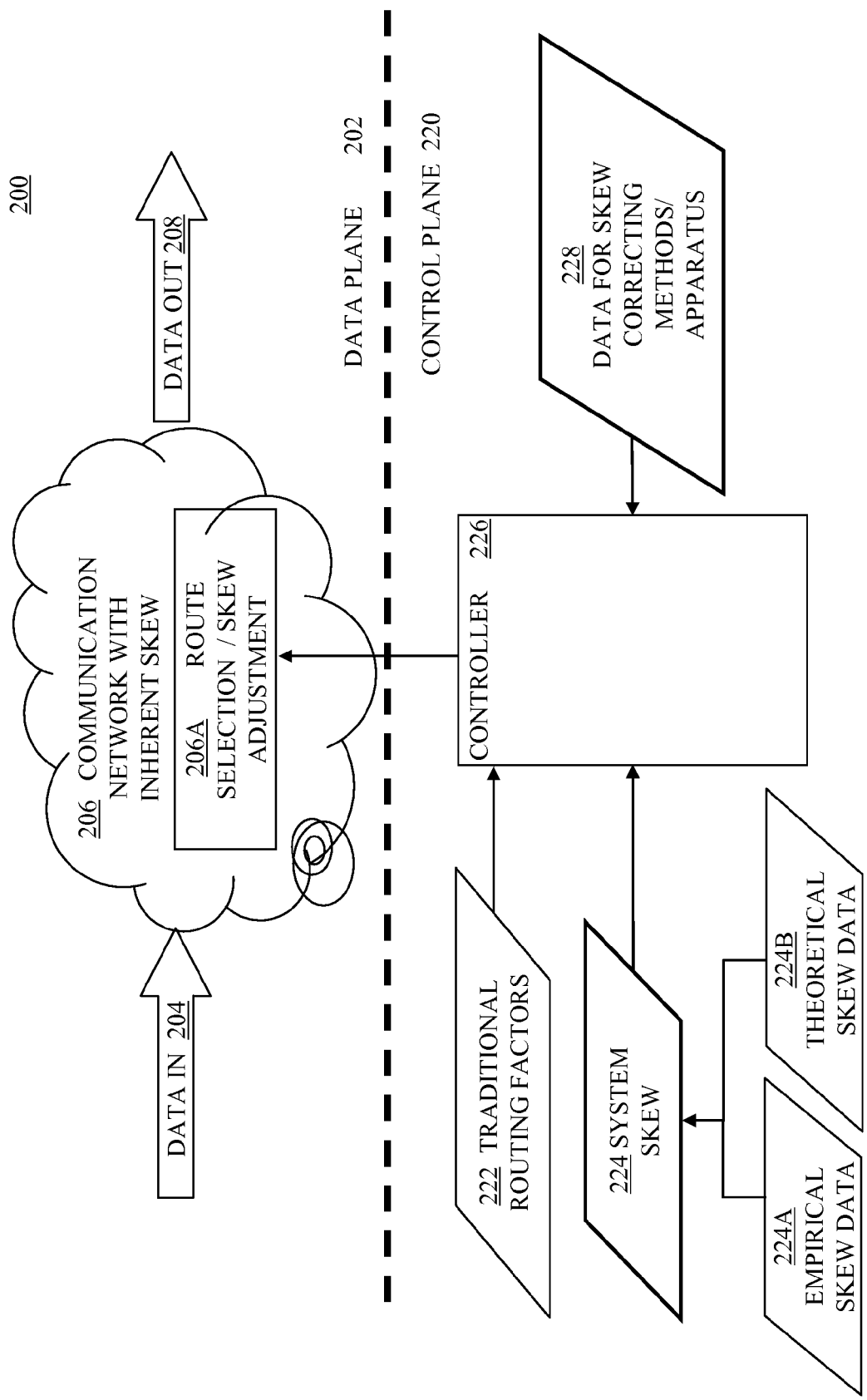
FIG. 2 is a functional block diagram of a communication network that considers skew information for routing information on a network, in accordance with various aspects of the present invention.

FIG. 2 illustrates a functional block diagram 200 of a communication network that considers skew data for routing information across a network in accordance with various aspects of the present invention. Information is any data, such as content, control, overhead, metadata, redundant or protection data, correction data, etc. that is transported along a path in the network.

Figure 1:
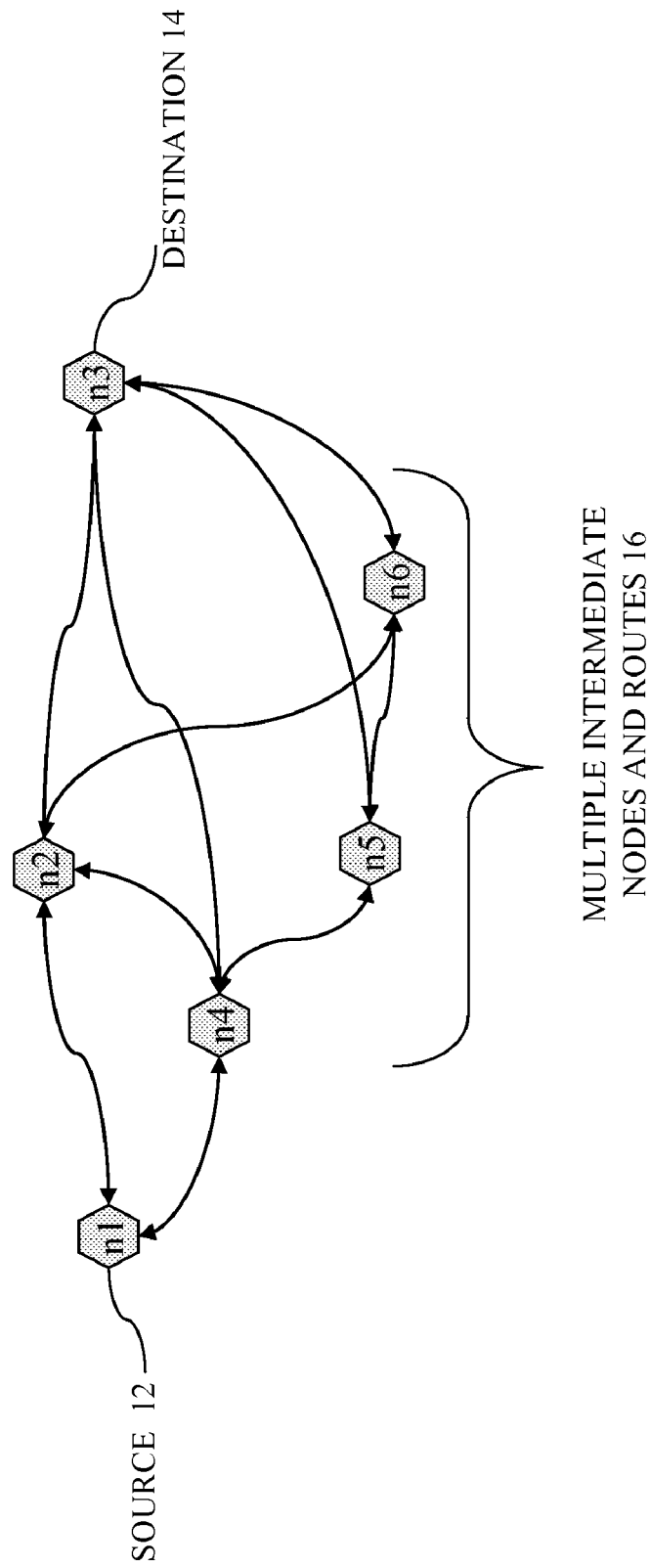
FIG. 1 is a schematic of an optical transport network as known in the art.

Communication network 206 can, in various embodiments, incorporate portions of legacy communication network 10 from FIG. 1 along with additional control, methods and/or apparatus to enable the measurement, control, and/or adjustment of skew on the communication network as described in the present disclosure. A node in the communication network 206 can be any node where transmitted information is managed, processed and/or signal performance is evaluated via measurement devices.

Ingress data 204 is provided to communication network 206 as client signals in the data plane 202 and is communicated to another node in the network and exits as client signal egress data 208 in the data plane 202. In a communication network with multiple communication paths, skew should be addressed in order to avoid certain types of network failure events such as dropping signals, losing packets caused by overflowing memory buffer capabilities and to satisfy quality of service standards.

Embodiments of the present invention provides for route selection and skew adjustment 206A in communication network 206 via controller 226 in the control plane 220 of network 200. The controller 226 receives traditional routing factors input 222, such as distance, traffic, and other factors related to characteristics of the path(s). Controller 226 also receives system skew information input 224 that can be derived from theoretical skew data calculation input 224B, or from empirically measured system performance and characteristics input 224A. Input 224 may be existing skew properties in the network that must be overcome in order to meet an allowable skew specification at a destination. Additionally, controller 226 also receives input data 228 for skew correction, such as theoretical and available electronic and optical skew adjustment resources, re-routing options and availability and prioritization of resources, etc.

In accordance with certain embodiments of the invention, nodes can be traditional analog nodes, digital nodes, hybrid nodes that allow signal management, or any combination thereof. Analog nodes may be amplifiers, or regeneration nodes, such as 3R or 4R regeneration. Nodes can also be digital nodes, implementing an optical to electrical to optical translation ("OEO") such as described in case as disclosed and taught in U.S. patent application Ser. No. 10/267,331, filed Oct. 8, 2003, entitled "TRANSMITTER PHOTONIC INTEGRATED CIRCUITS (TxPIC) AND OPTICAL TRANSPORT NETWORKS EMPLOYING TxPICs" and in U.S. patent application Ser. No. 10/267,212, filed Oct. 8, 2002, entitled "DIGITAL OPTICAL NETWORK ('DON') ARCHITECTURE", and U.S. Pat. No. 7,116,851, issued Oct. 3, 2006, entitled "AN OPTICAL SIGNAL RECEIVER PHOTONIC INTEGRATED CIRCUIT (RxPIC), AN ASSOCIATED OPTICAL SIGNAL TRANSMITTER PHOTONIC INTEGRATED CIRCUIT (TxPIC) AND AN OPTICAL TRANSPORT NETWORK UTILIZING THESE CIRCUITS", all of which patent applications and patents are incorporated herein by reference. Reference to measuring signal performance can be implemented in either the electrical or optical domain, as will be more fully described later.

Figures 3A, 3B:
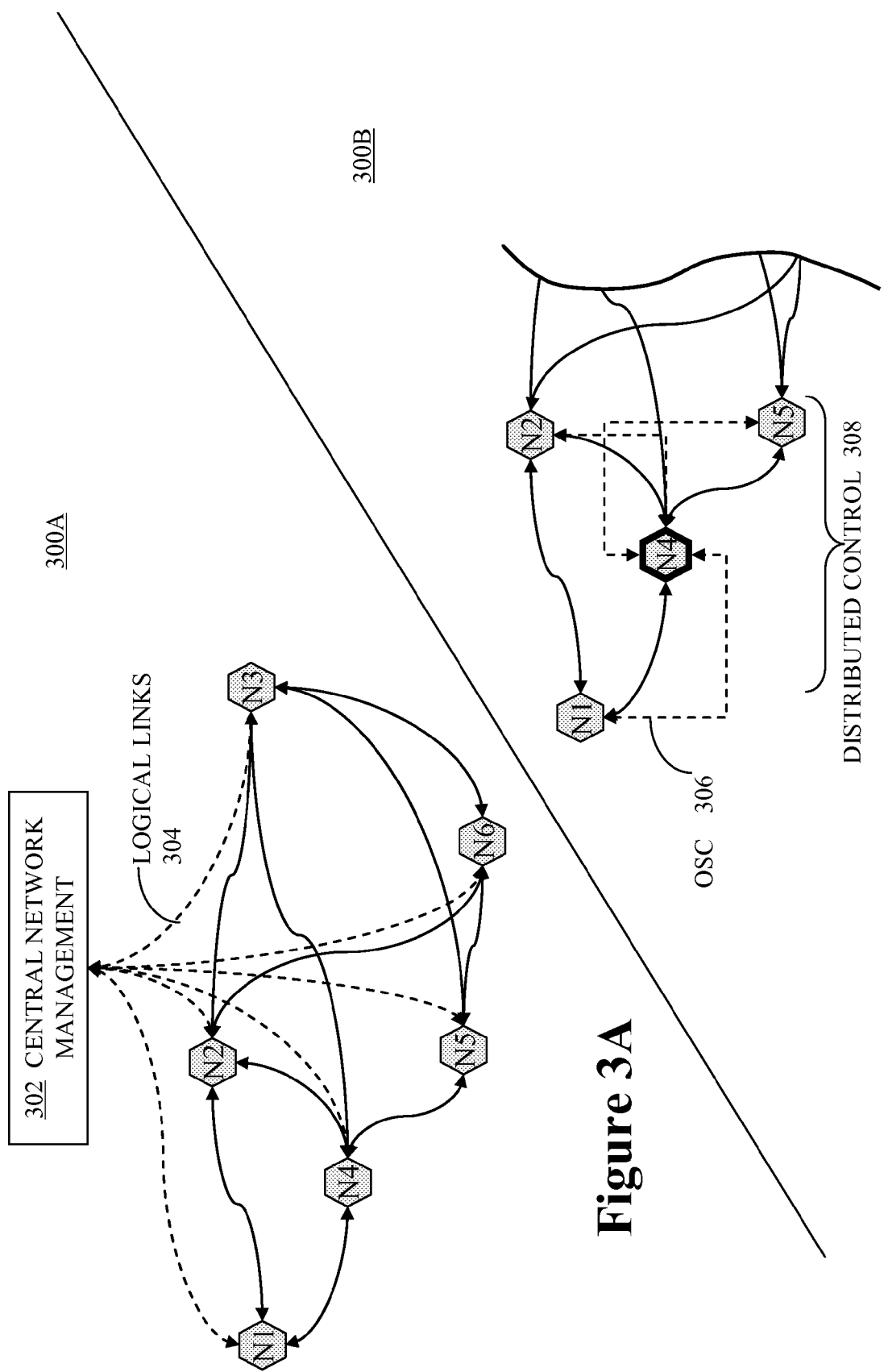
FIGS. 3A and 3B are alternative architectures for managing skew control function in a communication network, in accordance with various aspects of the present invention.

Referring now to FIGS. 3A and 3B, two alternative architectures for managing skew in a communication network are illustrated in accordance with certain aspects of the present invention. In particular, the two different control architectures are utilized to measure, store, and update the intrinsic skew performance of the network 300A as well as to provide the necessary computation, route planning, adjustable skew resource allocation, and control signals to the resources in the network. As a result, skew is controlled for a chosen information signal or for the system as a whole; usually to minimize skew for a given signal, set of signals, or network as a whole, where needed, and to push skew to signals and portions of the network that are better able to tolerate the skew.

FIG. 3A provides a centralized network management station, while FIG. 3B provides a distributed/localized network management station in accordance with various embodiments of the invention. The tradeoffs between scalability, response time, and other design/system management characteristics or parameters can be taken into consideration when choosing a control architecture for implementing the present invention in a system architecture.

Referring to FIG. 3A, a central network management station 302 includes a controller, or microprocessor, with associated memory, I/O, and other hardware/software to enable the execution of logical instructions on input and output data. Station 302 can be a UNIX box, or any other operating system suitable to accomplish the functions mentioned herein. Central network management station 302 is linked to nodes N1-N6 (upper case) by logical links 304. Upper case designations for nodes N1-N6 are utilized for the figures illustrating the present invention to signify their ability to route information based on skew and/or to adjust skew, and thus distinguish them from the conventional node configuration in FIG. 1 with lower case designation for nodes.

The present invention is well-suited to be installed with and/or intermingled with legacy systems, thereby utilizing the capability of routing based on skew and compensating for skew within the systems.

The logical links 304 may be implemented in the network as nodes to the central network management station 302, e.g., similar to an optical supervisory channel ("OSC") protocol, or as a parallel linked network as shown. Logical links 304 may alternatively use digital communication network ("DCN") connectivity interfaces such as Ethernet, T1 connectivity between an OSC and the central network management, etc.

The present invention is well suited to any coupling arrangement, via any medium, to allow communication between the data and control planes in communication networks 300A and 300B. While the present invention illustrates a 1:1 linking between central network management station 302 and each node N, the present invention may only link a portion of the nodes in parallel, which then could subsequently link a coupled series of nodes. For example, central network management 302 could link directly to only nodes N2 and N4, with nodes N5 and N6 being subsequently coupled in series to N4. In this manner, a more efficient tradeoff between connectivity and speed of control may be reached.

Referring to FIG. 3B, a distributed network management architecture 300B is shown. In particular, at least one node has connectivity to another node (intranodal) to allow for the communication of resource status in the node for skew adjustment. The present invention is well suited to any form of connectivity that allows for distributed control 308 for skew measurement, communication, status, control, and/or etc. to/from a node, e.g., by optical supervisory channel ("OSC") 306. A given gateway network element ("GNE"), e.g., node N1 having access to a client outside the network, might have connectivity to multiple service network elements ("SNEs"), such as nodes N2, N4, and N5.

Alternatively, each node may have standalone skew measurement and correction capacities to simplify the required interaction between the nodes. The present invention is well suited to any combination of these or other control models that allow skew measurement and/or adjustment.

FIGS. 4A through 4D illustrate different skew routing and skew adjusting techniques that allow for improved efficiency, flexibility, and cost-effective skew management of information transmission through the network. An exemplary client signal to be transmitted on the networks 400A through 400D is demultiplexed into multiple channels to accommodate the size of the client signal. In this case, client signal is broken into multiple signal portions $C_1$-$C_4$ and communicated on network carrier frequencies, shown as $\lambda_1$, $\lambda_K$, $\lambda_L$, and $\lambda_M$, which are also referred to as a first virtual super wavelength ("VSW1A").

The quantity and frequency of channels within an optical carrier group ("OCG") may vary in accordance with the network system and environment in which it operates. For example, an OCG may depend on the resources available on the network, the skew and traditional metric performances of the network, and the controller assigning the resources. The VSW1A is received and re-sequenced at the destination node (e.g. node N3) with acceptable skew performance, for reconstruction of the client signal and egress from the network. The information routing or skew adjustment described herein can be employed in combination or permutation with each other to provide additional options in routing and skew adjustment for the overall system. FIGS. 4A through 4D can be implemented in one embodiment employing hardware shown in FIGS. 5 and 6A and 6B, and employing processes described in FIGS. 7-10.

Figure 4A:
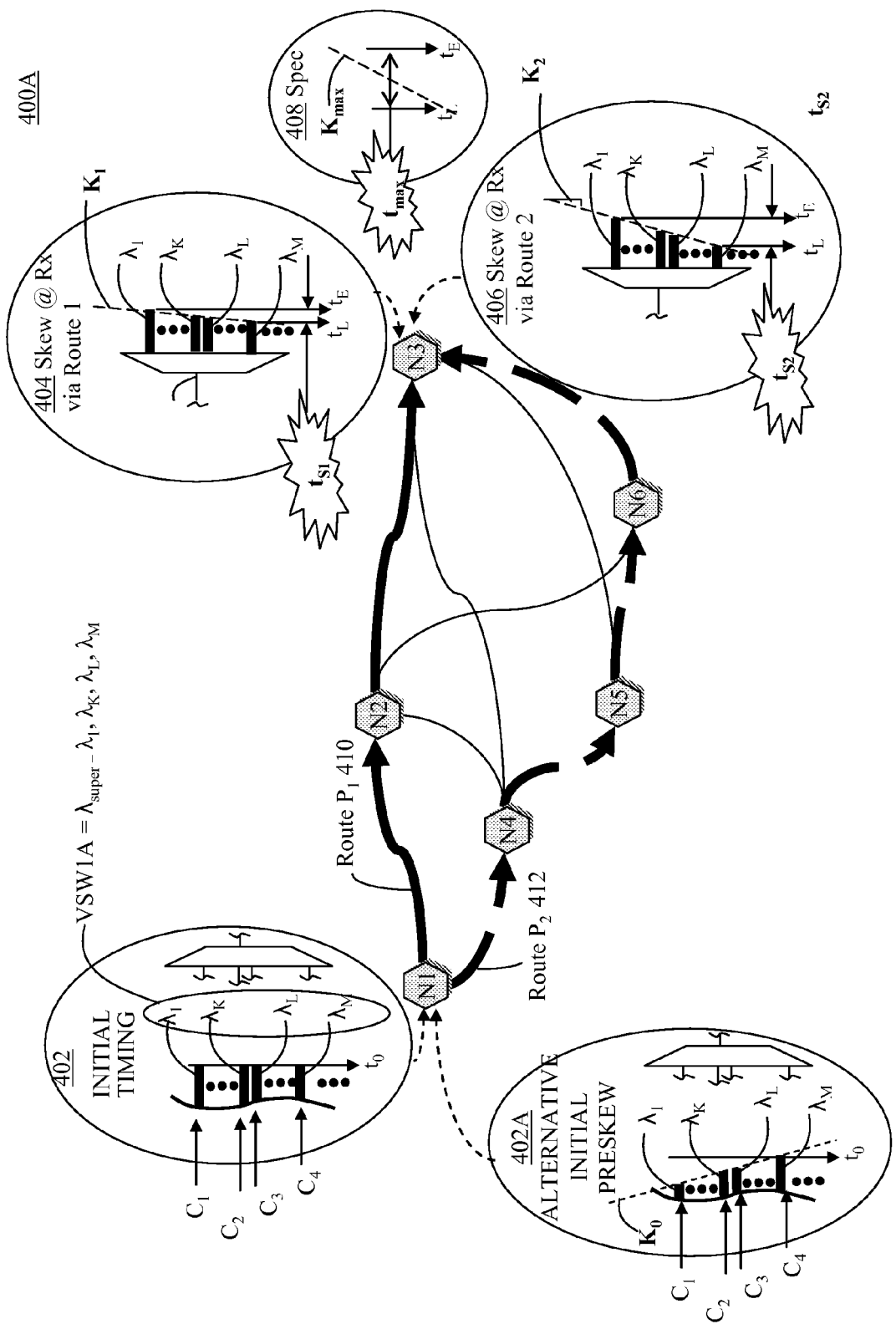
FIG. 4A is a network illustration of skew performance variation occurring over multiple communication paths via multiple routes, and the identification of the better route in terms of skew, in accordance with various aspects of the present invention.

Referring to FIG. 4A, a network illustration 400A of skew performance variation occurring over multiple communication paths and the identification of the better route in terms of skew is shown, in accordance with various aspects of the present invention. Initial timing of associated data can either be synchronized as shown in initial timing 402 at $t_0$, or can implement a preskew timing of signals 402A, wherein information on $\lambda_1$ is delayed relative to the other wavelengths. The group of wavelengths is increasingly delayed from $\lambda_1$ to $\lambda_M$ of VSW1A relative to with a preskew dispersion slope $K_0$.

The allocation of data across the multiple routes is determined by the skew between the channels (e.g., $\lambda_1, \lambda_K, \lambda_L, \lambda_M$). If associated data signals are transmitted on route $P_1$ 410, then the resulting skew is the time difference between the earliest signal $t_E$ and latest signal $t_L$ occurring between the signals at their destination, node N3, illustrated as skew 404 (e.g., time $t_{s1}$) with an associated skew dispersion slope of $K_1$. Alternatively, if the associated data signals are transmitted via route $P_2$ at 412, there results at the destination node N3 a timing skew 406 is illustrated, such as $t_{S2}$, with an associated skew dispersion slope of $K_2$.

The skew associated with the different routes $P_1$ and $P_2$ may be analyzed at the destination node to select an optimal route. These different skews may also be compared to certain parameters 408, such as max allowable skew $t_{MAX}$, or maximum allowable skew slope $K_{MAX}$, in order to select a preferred route. The skew may also be analyzed at intermediate nodes to select an optimal route or identify that skew falls within parameters.

The evaluation of skew may identify that skew has fallen outside of a preferred specification or range, and initiate a skew adjusting procedure. The skew consideration of each link, or span, in the network may be considered and summed for analysis relative to the allowable skew tolerance for a given communication network specification or standard.

Figure 4B:
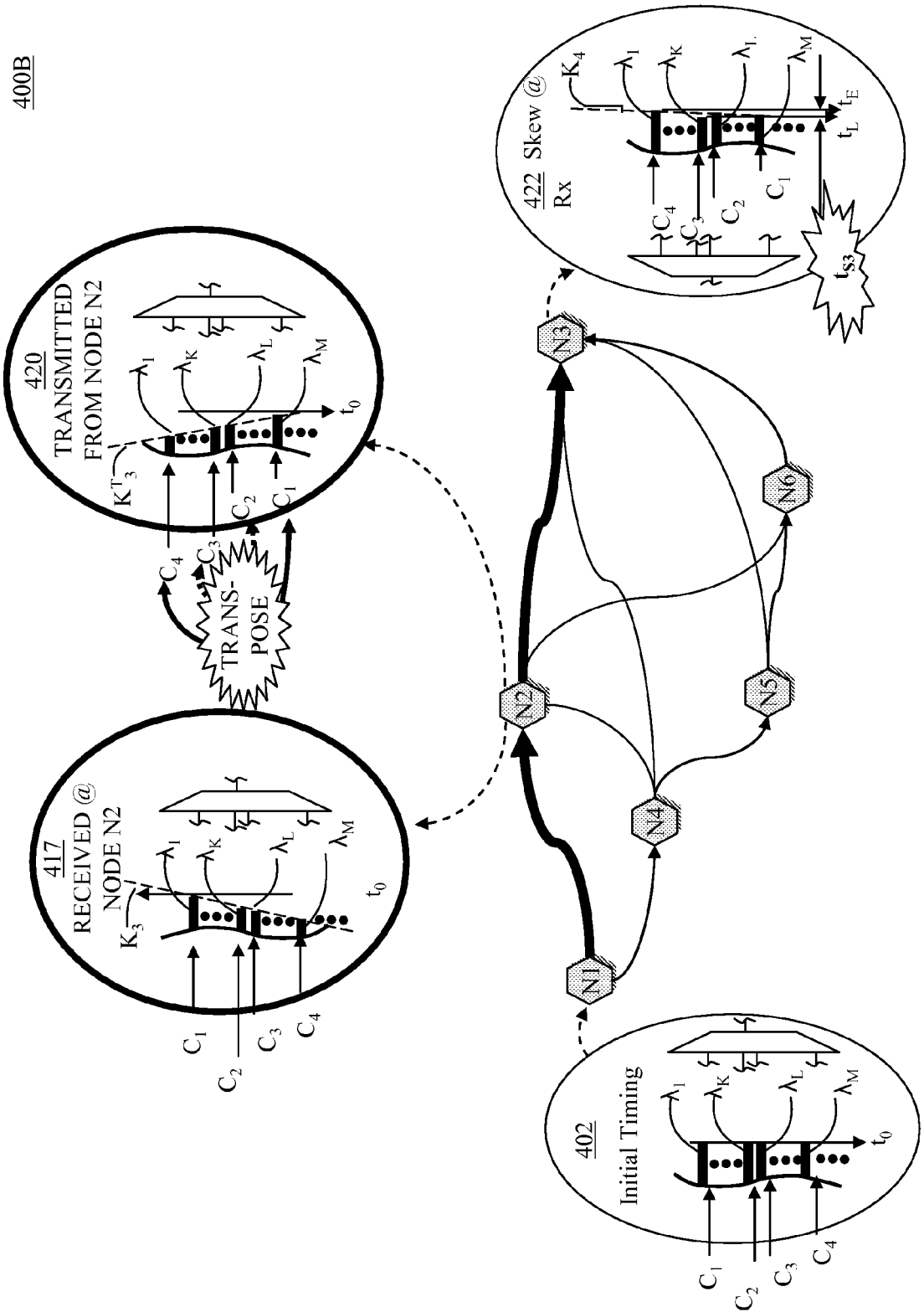
FIG. 4B is a network illustration of skew adjustment via wavelength reassignment of the multiple communication paths at a node between the source node and the destination node, in accordance with various aspects of the present invention.

Referring to FIG. 4B, a network illustration 400B of skew adjustment via wavelength reassignment of the multiple communication paths is shown in accordance with various aspects of the present disclosure. In these embodiments, a given client data signal is separated into four subsignals (e.g., signal portions $C_1$-$C_4$) to be routed on different communication paths over the network as associated data. Associated data means the multiple signals are associated with each other as being part of the original client data signal and are reassembled at a destination node to recreate the client data signal.

The format of the signal portions may depend upon the protocol of a given system such as protocols defining the distribution of payload, forward error correction ("FEC") data, overhead (OH) data, etc. Assuming initial timing 402 in FIG. 4B, if a set of associated data signals are determined to have unacceptable skew performance at the destination or any intermediate node, wavelength reassignment may be utilized to improve the skew performance in the nodal network.

At an intermediate node, for example, if the signal is wavelength-swapped, then interchannel dispersion occurring between high and low frequencies can be compensated by inversing the wavelengths where the longest wavelength is swapped for the shortest transmission wavelength and the next longer wavelength is swapped for a shorter wavelength. In effect, the wavelengths are reversed in a manner that previously longer wavelength signals are substituted with shorter wavelength signals. For example, signal portion $C_3$ and $C_2$ are rerouted to be carried on swapped frequencies (e.g., $C_3$ is now carried on $\lambda_K$ and $C_2$ is now carried on $\lambda_L$). This can be accomplished by optical signal wavelength conversion, or by an optical-to-electrical-to-optical conversion that reassigns a signal portion to be transmitted on a channel with a different frequency laser.

If associated data signals are received at node N2 with dispersion slope $K_3$, as shown in the upper left side of FIG. 4B at 417, then the carrier wavelengths can be wavelength-swapped for a given set of associated data for a given client signal. Thus, if signal portions $C_1$-$C_4$ of a client signal are transmitted on carriers $\lambda_1, \lambda_K, \lambda_L$, and $\lambda_M$, respectively at source node N1, they can be transposed at intermediate node N2 to carriers $\lambda_M, \lambda_L, \lambda_K$, and $\lambda_1$, respectively, with new dispersion slope $K^T_3$ as seen at 420 in FIG. 4A. Wavelength reassignment in this embodiment assumes a linear dispersion slope of signal portions $C_1$-$C_4$ on carriers $\lambda_1, \lambda_K, \lambda_L$, and $\lambda_M$.

In an alternative embodiment, any signal portion can be reassigned to any carrier frequency, as best fits the overall skew reduction for the system, e.g., for non-linear channel performance as illustrated at 422 in FIG. 4A. After performing the wavelength reassignment, associated data $C_1$-$C_4$ is received at destination node N3 with a resultant adjusted, or minimized, skew 422 of $t_{S3}$, and associated nonlinear dispersion slope of $K_4$; a superior skew performance than the same signals would have had without the wavelength reassignment. Minimal skew is the resultant skew of the client signal portions at the destination node that meets the specified allowable skew tolerance for the system and that has been managed by the controller to provide either the least amount of skew available for the VSW or VWG on the available resources of the network or with a reasonable amount of skew in consideration for other performance tradeoffs.

Figure 4C:
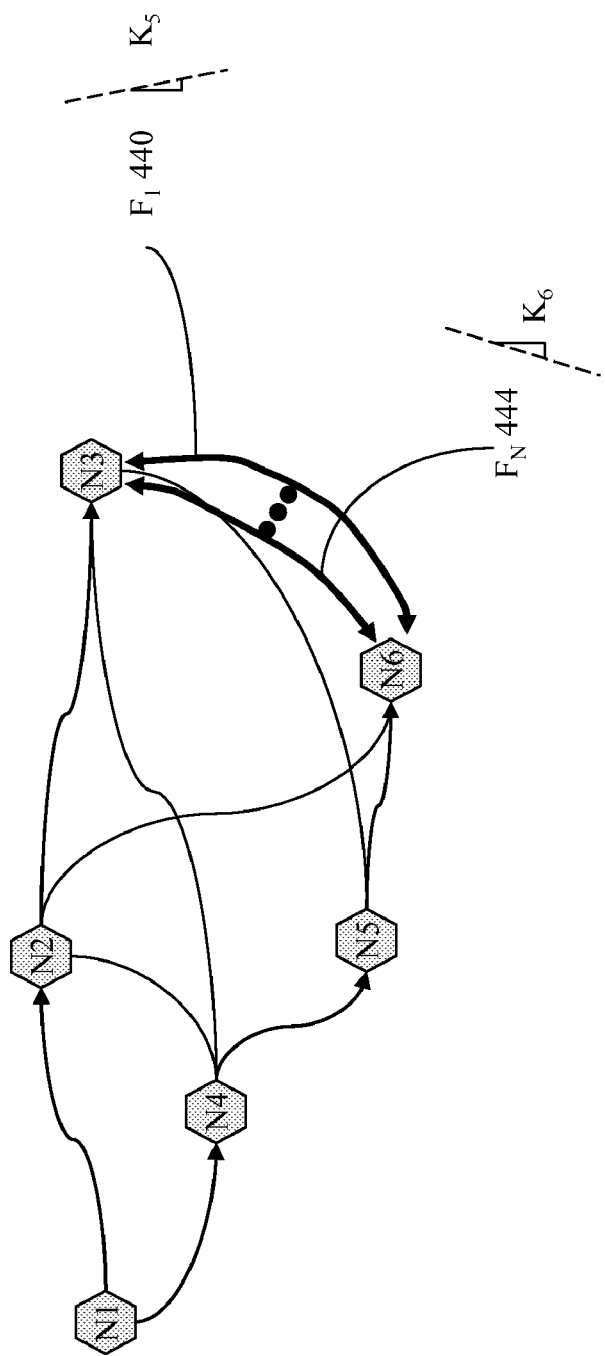
FIG. 4C is network illustration of skew adjustment via selection of one fiber from multiple fibers depending on the dispersion slope of the fiber, in accordance with various aspects of the present invention.

Referring now to FIG. 4C, a network illustration 400C illustrates skew adjustment via selection of one fiber from a possible group of different multiple fibers depending at least in part on the particular dispersion slope, $K_X$, of the fiber which is shown in accordance with various aspects of the present invention. Multiple optical fiber links, $F_1$ 440 to $F_N$ 444, are coupled between nodes N6 and N3, where each fiber may have different dispersion compensation slopes, $K_5$ and $K_6$, respectively. The multiple fiber route scenario via $F_1$ 440 to $F_N$ 444 is similar to multiple physical routes 410 and 412 involving different nodes in the network as illustrated in FIG. 4A. However in the present embodiment, there may not essentially be any diversity in fiber lengths of the fiber group between nodes N3 and N6 since these two nodes are at the same distance apart for any one fiber of the fiber group $F_1$ 440 to $F_N$ 444. Thus, a finer skew adjustment may be possible by considering only the nonlinear variations of the different fibers.

Figure 4D:
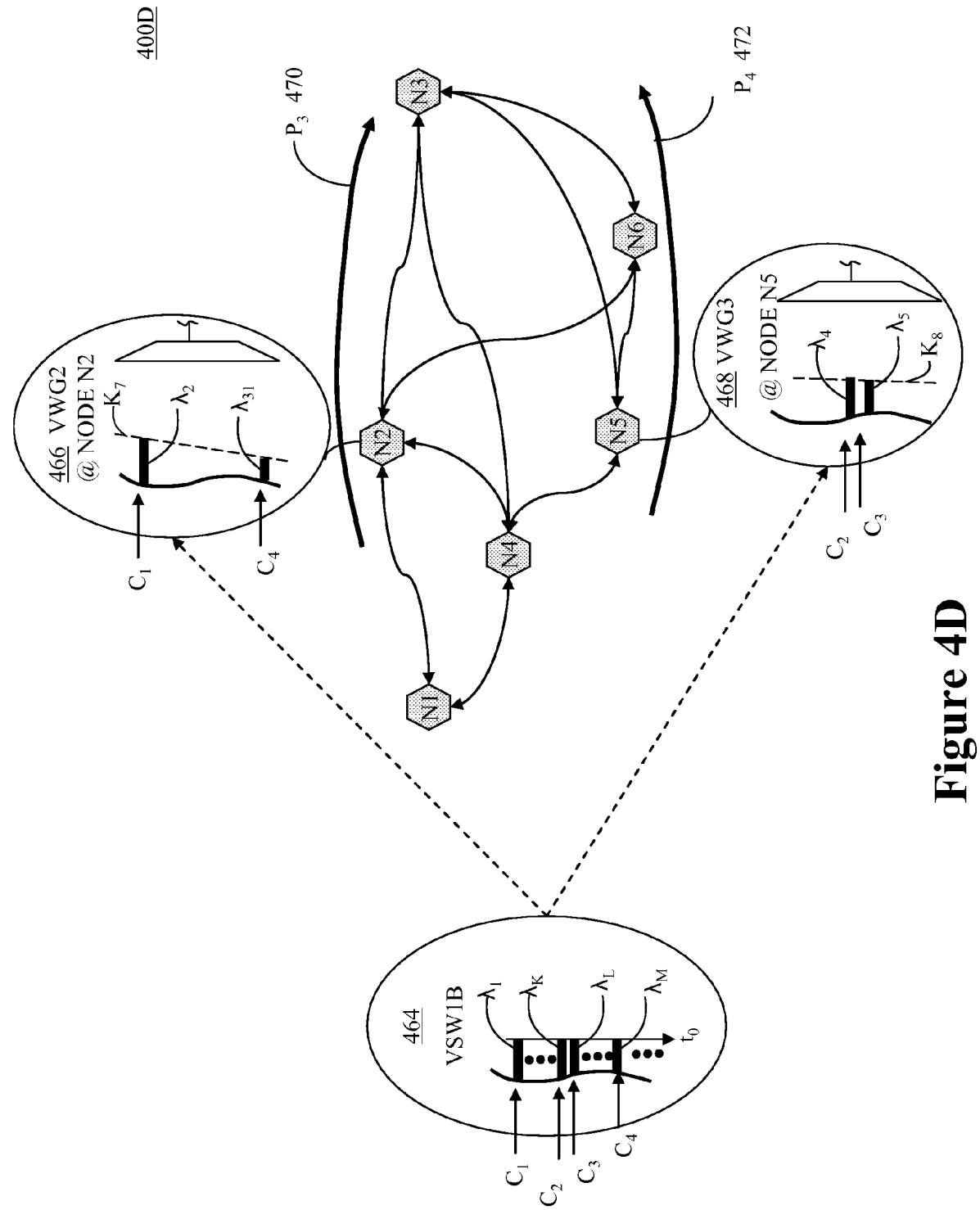
FIG. 4D is a network illustration of dividing a virtual super wavelength into multiple virtual wavelength groups and routing them on different routes on the network, in accordance with various aspects of the present invention.

Referring now to FIG. 4D, a network diagram illustrates a divided client signal into two routes in accordance with various aspects of the present invention. As defined above, a client signal may be routed as a virtual super wavelength ("VSW"); for example, the client signal is co-routed on multiple channels on the same path, the same nodes and/or fiber. If a VSW routing is not available, then the client signal may be routed along different routes on the network as two or more virtual wavelength groups ("VWG") (e.g. routed as multiple groups wherein each group of one or more channels is routed on the same path).

A VWG can be any size and grouping of signals as is appropriate for channel bandwidth between nodes, and that skew and other performance specifications allow. In the present example, associated data, VSW, is initially scheduled to be transmitted as associated client signal portions $C_1$-$C_4$ on carriers $\lambda_1, \lambda_K, \lambda_L$, and $\lambda_M$, where client signal portions $C_1$-$C_4$ refer to a portion of the client signal that is transmitted on any available carrier, e.g., $\lambda_1, \lambda_K, \lambda_L$, and $\lambda_M$. The specific content of $C_1$-$C_4$ and the specific wavelengths on any given path are decided by the controller, such as a central controller 302 or a node controller. Thus, as the traffic rate increases, the content distribution $C_1$-$C_4$ may vary across the respective carriers, e.g., $\lambda_1, \lambda_K, \lambda_L$, and $\lambda_M$. In fact, if the controller so evaluates it, the client signal may be adjusted from content distribution $C_1$-$C_4$ on carriers, e.g. $\lambda_1, \lambda_K, \lambda_L$, and $\lambda_M$ to content distribution $C_1$-$C_3$ on respective carriers, e.g. $\lambda_1, \lambda_K, \lambda_L$, and $\lambda_M$.

However, in this illustration, sufficient channel count, or bandwidth, was not available on path $P_3$ 470 between the source node N1 and the destination node N3 to co-route the entire client signal (e.g., client signal portions $C_1$-$C_4$) as a Virtual Super Wavelength, VSW1B 464. Consequently, the exemplary controllers described with reference to FIGS. 3A and 3B, evaluates the network demands (e.g., traffic, network resources, bandwidths, etc.) and concludes that the VSW should be divided into two or more virtual wavelength groups. For example, VWG1 may be divided into client signal portions $C_1$ and $C_4$ on carriers $\lambda_2$ and $\lambda_{31}$ on transmitted on path $P_3$ 470, and wavelength group VWG2 may be divided into client signal portions $C_2$ and $C_3$ on carriers $\lambda_4$ and $\lambda_5$ on path $P_4$ 472. For simplicity, it is assumed that carrier wavelengths are consistent across the several spans shown, though carrier wavelength diversity can be used.

Note that in the present embodiment, client signal portions $C_1$ and $C_4$ are co-routed as one VWG2 on outer wavelengths $\lambda_2$ and $\lambda_{31}$, while client signal portions $C_1$ and $C_4$ are co-routed as another VWG3 on nominal wavelengths $\lambda_4$ and $\lambda_5$, similar to that illustrated in prior FIG. 4B. In this manner, skew of VWG2 at node N2 466 may undergo skew adjustment procedure because the more extreme frequency values, $\lambda_2$ and $\lambda_{31}$ of VWG2 will exhibit more skew, $K_7$, at node N2, than the nominal frequency values $\lambda_2$ and $\lambda_3$ of VWG3 with skew $K_8$ illustrated at N5 468. Thus, client signal portions C2 and C3 may not require skew adjustment between the source node and destination node.

Different quality of service signals may be routed in this manner to provide preferred performance characteristics. If client signal portions C2 and C3 are more time-sensitive, or contain more sensitive data, the portions may be transmitted on a preferred physical route, preferred carrier wavelength, preferred grouping, and/or preferred fiber (i.e., preferred with respect to minimized skew slope, signal dispersion, fiber dispersion, and resultant skew between client signal portions).

A client signal portion by itself, or a VWG, may be re-routed at a node to travel a different path. A re-routing of this sort is accomplished by communicating the client signal portion(s) to a multiplexing device, such as a band multiplexing module ("BMM") shown in subsequent FIG. 5, which subsequently multiplexes optical signals and communicates them to a given node. Rerouting of a VWG in the present disclosure is accomplished by switching in the electrical domain of a node and routing a client signal portion to a multiplexing module, whose function is to combine carrier frequencies within a given carrier group for transmission on a fiber medium, as shown in subsequent FIG. 5. If a client signal portion is switched to a different multiplexing module, then the same carrier wavelengths may be utilized for both VWGs, as they will not conflict on different multiplexing modules routing on different fiber links. If client portion signals are communicated on the same carrier wavelengths for different VWGs (e.g., on different paths) and if the client portion signals are to be combined or redistributed at a subsequent node, then any potential conflict of client signal portions on the same wavelength at that downstream node can be resolved by assigning appropriate non-conflicting wavelengths at the given node, as directed by the controller.

Figure 5:
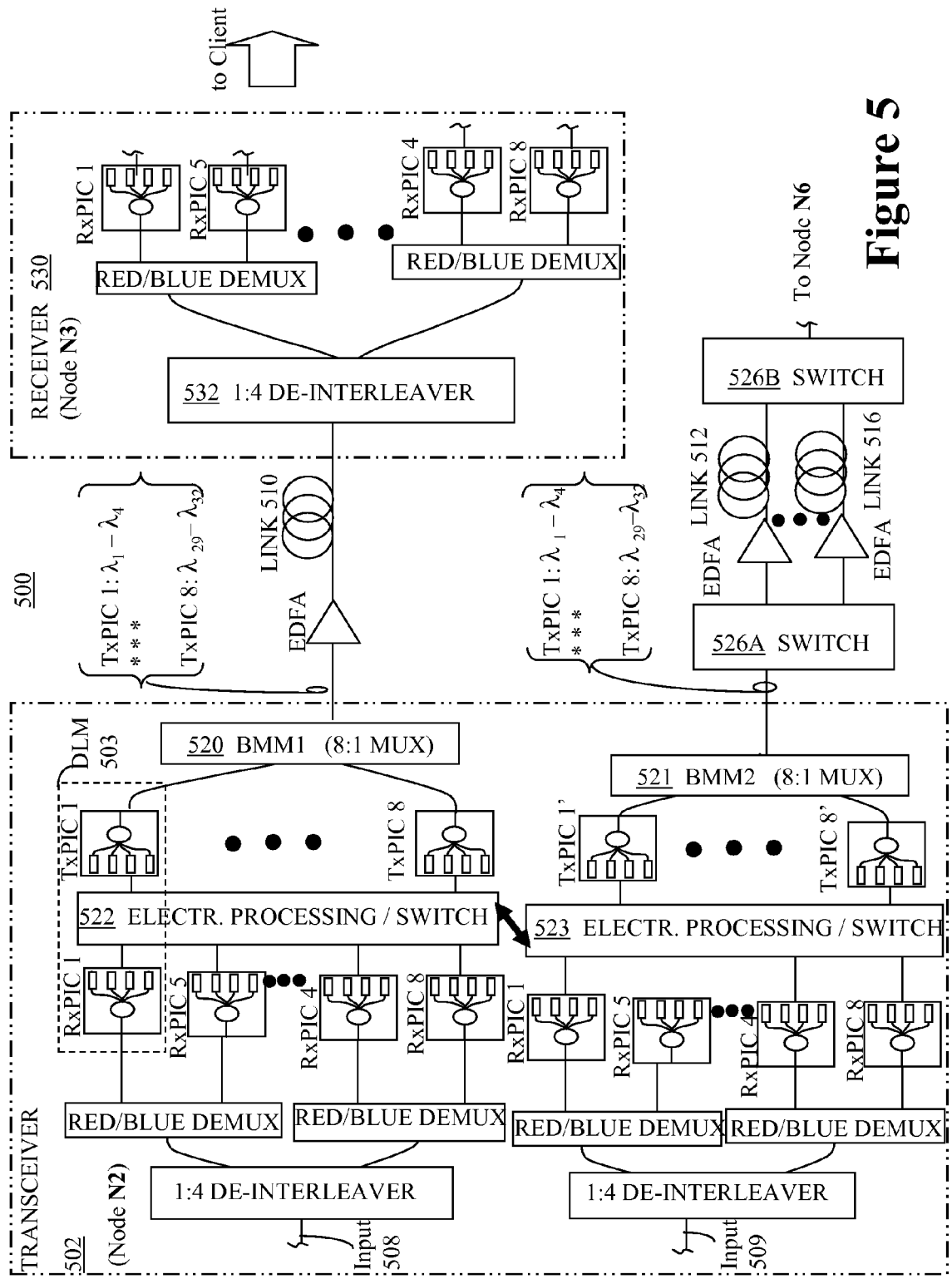
FIG. 5 is a schematic of a transceiver node with its internally coupled and switched band modules each coupled to different nodes for space diversity routing, in accordance with various aspects of the present invention.
Figure 6A:
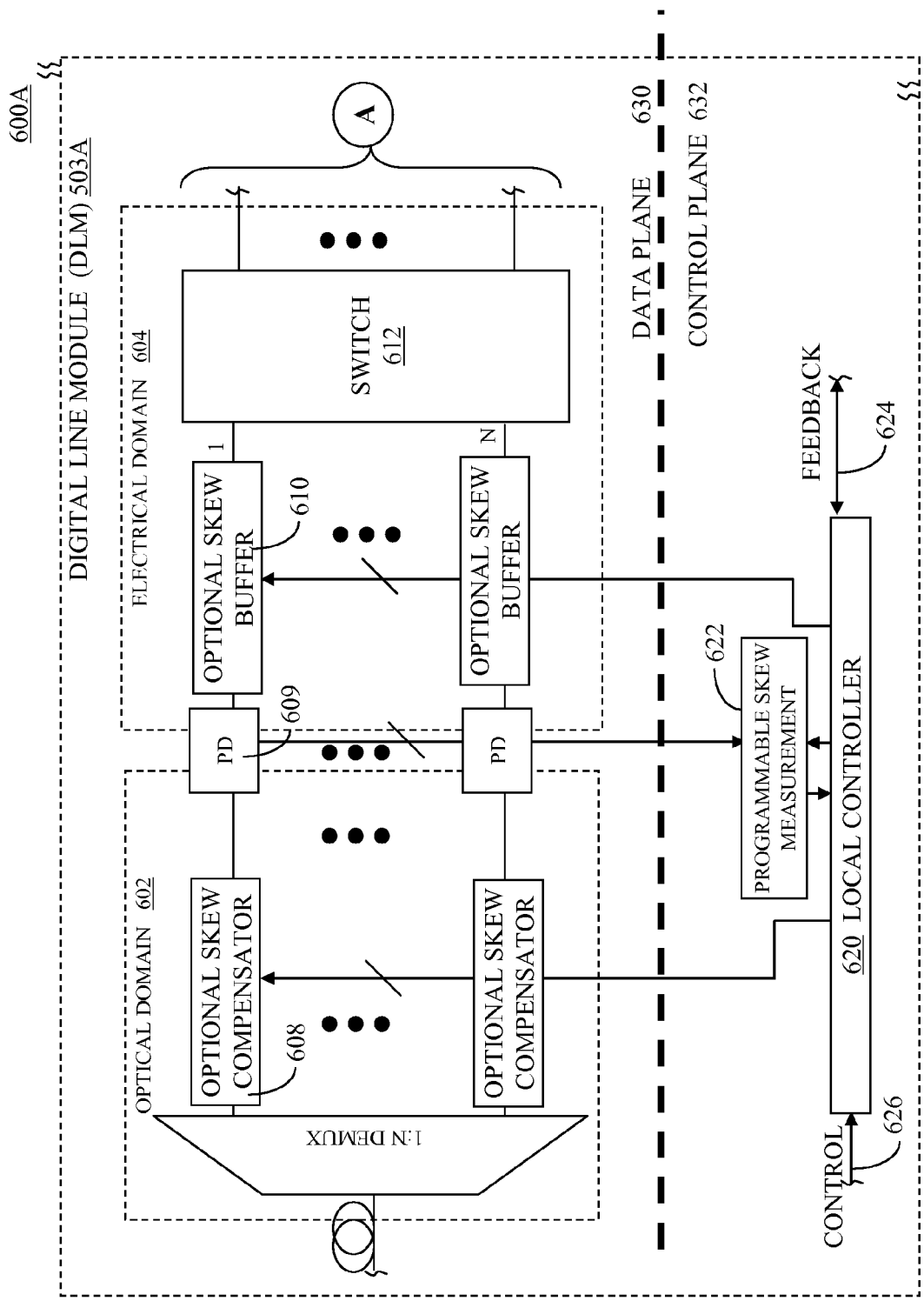
FIG. 6A is a schematic of a receiver portion of a line module wherein the receiver has optical skew compensation with electronic skew measurement and buffer, in accordance with various aspects of the present invention.
Figure 6B:
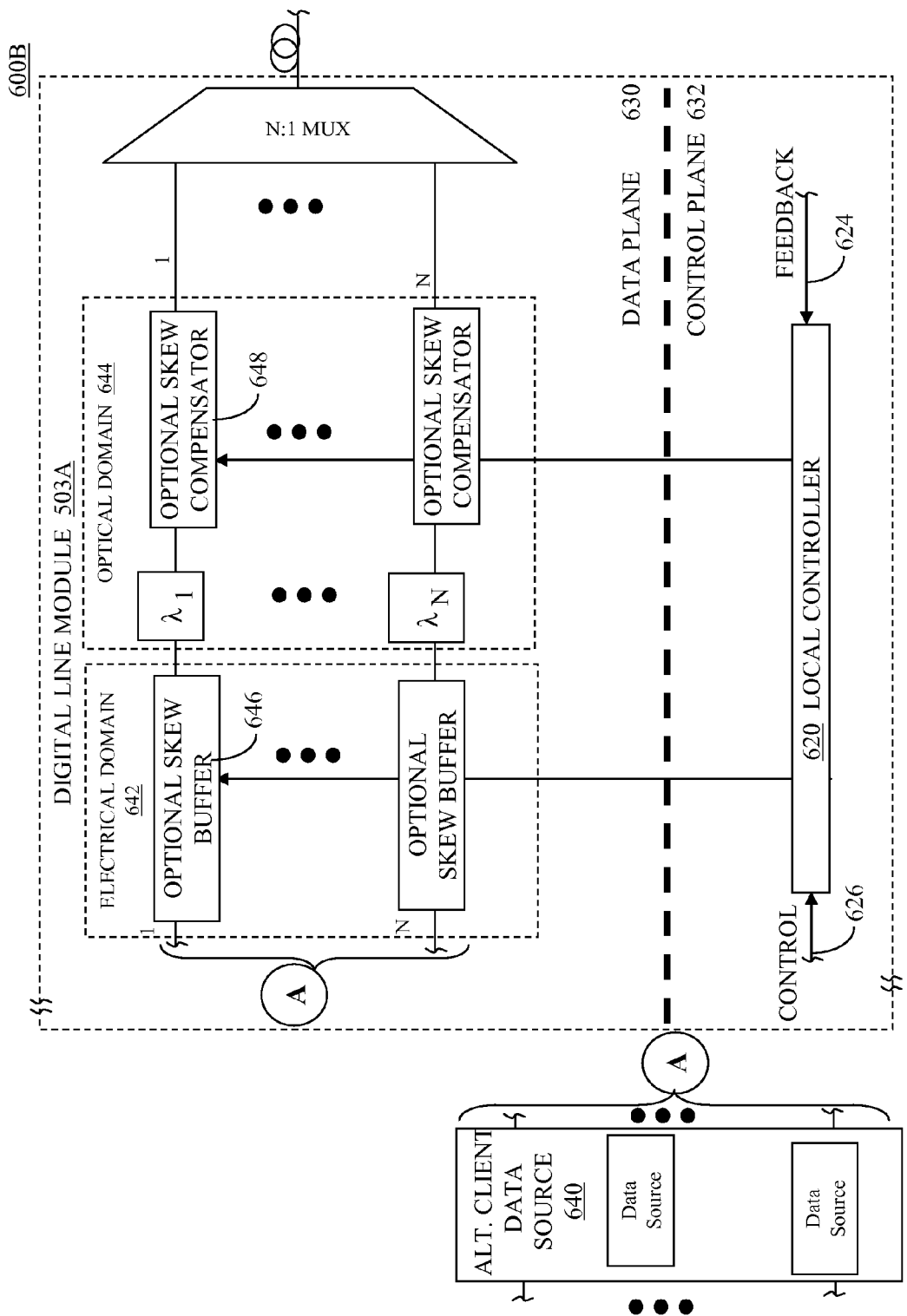
FIG. 6B is a schematic of a transmitter portion of a line module wherein the transmitter has optical skew compensation and electronic skew measurement and buffer, in accordance with various aspects of the present invention.

In FIGS. 5, 6A and 6B, a novel switching function in a node of a network is illustrated in accordance with various aspects of the present invention. The switching function allows rerouting of a portion of information, such as a portion of a client signal, on a different wavelength, different fiber, and/or to a different node. Rerouting can be managed so as to provide for skew adjustment in order to provide better quality of service of the overall information transmitted over the network.

FIGS. 5, 6A, and 6B also illustrate an apparatus for implementing the skew adjustment within an exemplary node that also employs optical to electrical to optical ("OEO") conversion. Once in the electrical domain, client signals enjoy the benefits of digital signal processing, switching (channel and band allocation), and signal regeneration that correspond to electronically implemented functions. However, the present invention is also well suited to performing functions off frequency translation/conversion for purposes of rerouting in the optical domain, e.g. using a PIC, PLC, or discrete electro-optical and optical devices. For example, a nonlinear process in semiconductor optical amplifiers ("SOAs") or a highly nonlinear fiber could be utilized to satisfy frequency translation/conversion needs. Additional detail on the design, function and architecture of the TxPIC, RxPIC and DON can be found in U.S. patent application Ser. Nos. 10/267,331, 10/267,212, and U.S. Pat. No. 7,116,851, all of which are incorporated by reference in their entirety.

Referring in particular to FIG. 5, system 500 includes a transceiver node 502 coupled to receiver 530 and coupled to Node N6 (not shown) via switches 526A and 526B in accordance with various aspects of the present invention. Transceiver node 502 is coupled to one or more multiplexing modules, such as band multiplex modules ("BMM"), each coupled to different nodes for space diversity routing. Transceiver node 502 correlates to exemplary node N2 from FIGS. 4A-4D, and has a portion of communication paths from the WDM signal outputs from TxPIC1 through TxPIC8 coupled via BMM1 520 and fiber link 510 to a downstream receiver 530 and its BMM 532 correlated to exemplary node N3 from FIGS. 4A-4D.

Transceiver node 502 is a multi-channel device with multiple DLM 503 modules each of which contain an RxPIC and a TxPIC, a group of which are coupled into a band MUX module ("BMM") that multiplexes the range of wavelengths (e.g., TxPIC1 $\lambda_1$ through TxPIC8 $\lambda_{32}$) into a WDM signal for transmission on fiber link 510 to a downstream node. Inputs 508 and 509 are coupled from upstream nodes in the communication network. Within each DLM, electronic processing and switching blocks 522 and 523 provide options to manage the transmitted information in the electrical digital domain, including skew management functions, described in more detail in subsequent figures. While all the wavelengths processed by transceiver 502 may be within in the C-band, this band may be divided between a red portion of the C-band, to represent lower wavelengths in the signal spectrum, and the blue portion of the C-band, to represent higher wavelengths in the signal spectrum. While the present embodiment constrains the spectrum of wavelengths for transmission within the C-band, the present invention is well-suited to using any combination and location of wavelengths such as utilizing multiple bands, e.g., L-band, S-band, any other band or to utilizing divisions within a band, for communication path diversity.

In certain embodiments, two nodes may be coupled via multiple fibers that can be selected for their different skew properties, such as their different dispersion properties between channels that will allow carriers at different wavelengths to arrive at a downstream node at different times. Transceiver node 502 has BMM2 521 coupled to node N3 via switch 526A and 526B on either end of the multiple links 512 through 516, which correlate, for example, to fiber $F_1$ 440 through fiber $F_N$ 444 of FIG. 4C, with different dispersion slopes K5 through K6, respectively. Switches 526A and 526B are any switch, that functions to couple one of the multiple fibers to each node, such as by an external 1×N mechanical switch, thermo-optic optical switch, or micro-electrical-mechanical ("MEMs") switch.

Referring now to FIGS. 6A and 6B, a more detailed illustration of an exemplary transceiver digital line module ("DLM") 503A is presented in two parts, with FIG. 6A illustrating a receiver portion of the DLM, and FIG. 6B illustrating a transmitter portion of the DLM. DLM 503A in FIGS. 6A and 6B correspond to DLM 503 block portion of the transceiver 502 shown in FIG. 5. Output A from receiver portion of DLM is received as input A at the transmitter portion of DLM.

Referring specifically to FIG. 6A, a schematic of a receiver portion 600A of a digital line module 503A is shown wherein the receiver has optical skew compensation, with electronic skew measurement and skew buffer in accordance with various aspects of the present invention. Receiver portion of DLM 503A has an optical domain 602 with customary components such as 1:N DEMUX and an array of photodetectors (PDs) for $\lambda_1$ to $\lambda_N$.

Certain embodiments provide coupling from the photodetectors to a programmable skew measurement device 622. The skew measurement device is enabled to capture skew measurements via a comparator (e.g., a differential sense amplifier, and other digital signal processing techniques) that correlates the output from a photodetector with a predetermined bit pattern. The bit pattern is replicated in a marker of a test signal transmitted to the DLM 503A during a learning mode for the network. This skew testing process is also referenced in process 1700 of FIG. 7. Skew measurement device 622 has multiple instances of correlation ability along with a local clock input for measuring the difference in time from receipt of the marker for each of the multiple channels $\lambda_1$ to $\lambda_N$. Alternatively, programmable skew measurement device 622 may include the capability to perform a relative comparison measurement between any two wavelengths at a given time for comparison testing. This pattern can be repeated for different wavelengths, as directed by local controller 620, in combination with a central network controller, e.g., controller 302 in FIG. 3 as coupled via line 626.

Local controller 620 is coupled to skew measurement device 622, in the control plane 632, to provide initiation signals for test mode, selection of wavelengths to measure, and reception of skew data. Local controller 620 in the current node is coupled via a unidirectional or bidirectional line 624 to other nodes in the network to share skew data measurements, skew resource status, skew needs, and skew resource allocation.

Besides providing skew measurement control, various nodes in these embodiments of the invention provide an optional skew compensator 608 for each channel in the optical domain 602 of the node and optional skew compensator 610 in the electrical domain 604. Skew buffer 608 may be any optical device with delay properties, such as a ring resonator. In various embodiments, an optional skew compensator is provided for only a portion of the signal channels in the DLM 503A, such as on channels on which signals propagate at a higher rate per unit time, such as those on lower frequency channels. In other embodiments, optional skew compensator has a bypass that is enabled via local controller 620 if no skew adjustment is needed. Lastly, in another embodiment, no optical skew compensation is used because of higher cost, and sufficient capability of skew adjustment via routing, and/or buffering in the electrical domain.

Similar to optical skew buffer 608, optional electronic skew compensator 610 may be any buffer medium, such as a first-in-first-out ("FIFO") memory buffer, which serves delays the information on the given channel. In different embodiments, optional electronic skew compensator 610 can be implemented on all channels, or only on a fraction of the channels. Optional optical skew compensator 608 can be programmable to allow a variable amount of delay on the information transmitted thereon, with a bypass to reduce any incidental propagation delay that the device may exhibit even if no skew compensation is desired. Additionally, optional electronic skew compensator 610 may be located anywhere within the optical networking system, including at transmitting nodes, receiving nodes and intermediary nodes. After the appropriate buffering in the receiver, the electrical signals are communicated to switch 612, which can be any form of switch, such as cross-point switch, which enables rerouting of information signals from one channel, or wavelength, to another channel, or wavelength.

Referring specifically to FIG. 6B, a schematic of a transmitter portion of a line module 600B is shown wherein the transmitter has optical skew compensation and electronic skew buffer in accordance with various aspects of the present invention. Transmitter receives the electrical signals 'A' from the receiver of FIG. 6A or alternatively from a client data source 640, such as an add channel. Transmitter portion of DLM 503A also has electrical domain portion 642 and optical domain portion 644, with respective optional optical skew buffer 646, and optional electronic skew compensator 648. DLM 503A can utilize any combination of these delay devices in the transmitter and receiver as is applicable for a given design or application depending on the level of skew variation exhibited in the network. Optional buffers for FIGS. 6A and 6B are dedicated, distributed in-line buffers in the present embodiment. However, in-line buffers can also be a centralized, shared memory buffer, albeit with latency, cost, and flexibility tradeoffs.

Generally, the following flowcharts in FIGS. 7-10 describe methods, independent of structure, which may be implemented in various embodiments of the invention. Control signals, inquiries, and instructions can be implemented by controller configurations shown in FIGS. 3A and 3B, or otherwise described herein, with respective network apparatus. In various embodiments of the invention, associated data from a client signal is distributed and routed by different physical routing (nodes and fibers), different wavelength groupings, different wavelengths and/or OCGs, and with different skew adjustments. The specific communication paths provided therein are an exemplary allocation of routing and skew adjustments by a controller that evaluated system skew performance and resources.

Figure 7:
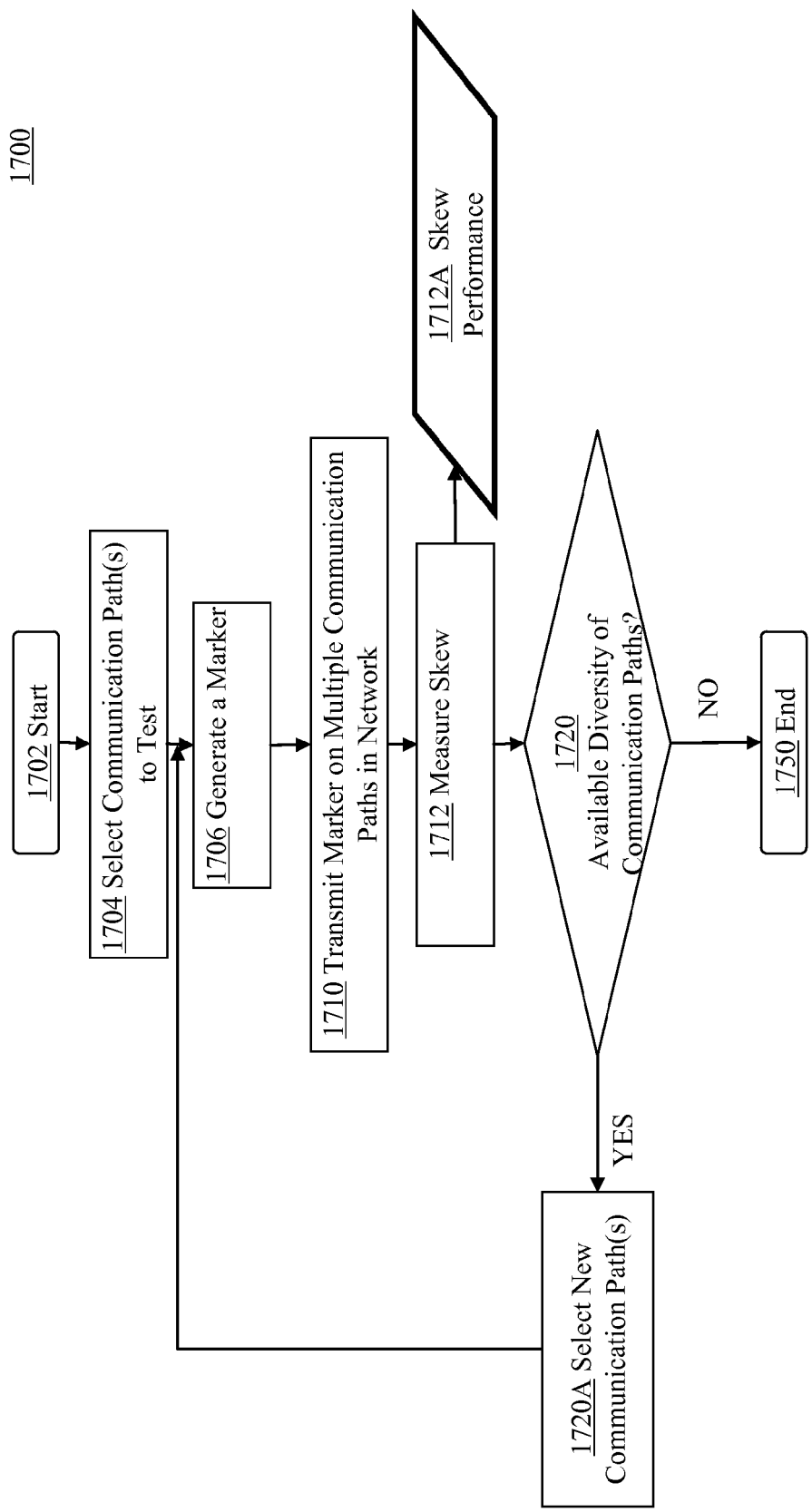
FIG. 7 is a flowchart of a process to empirically measure the skew of information transmitted by multiple communication paths in a communication network, in accordance with various aspects of the present invention.

FIG. 7 is a flowchart 1700 of a process to empirically measure the skew of information transmitted by multiple paths in a communication network in accordance with various aspects of the present invention. Measuring the skew of a given path can occur prior to establishing a circuit for a given client signal to provide more reliability in the quality of the signal as it is transported through a network.

A communication path(s) is selected 1704 in order to test skew properties thereof. Communication paths may be defined as having various lengths with differing number of intermediary nodes including, but not limited to, span-wise evaluation (e.g., from node N1-N2, from node N4 to N5, etc.), route-wise evaluation (e.g., from source node to destination node, N1 to N3 via node N2), or round-trip-wise (e.g., from source node N1 to destination node N3 (via node N2) and then back to original source node N1 (via node N2)).

A marker is generated 1706 for transmission on the chosen communication path(s). As also described in FIG. 6A, the marker is a preset bit pattern that will be used by a local node to match the same pattern in a test signal, whose arrival time will then be evaluated. The marker should be sufficiently unique, such as a pseudo-random binary sequence ("PRBS"), that it is not confused with a data signal. The marker may be a stand-alone signal(s) or may be inserted into a client signal running live traffic.

The marker is transmitted 1710 on multiple communication paths in the network. The communication paths can be tested in a parallel fashion, such that relative skew between two communication paths may be measured, or tested in series with synchronization and timing comparisons made by comparison to an accurate reference clock. The transmission of the test signal with marker can be performed either while the entire network is down, or while the network is communicating traffic on channels other than the channels, or communication paths, to be tested.

The skew is measured 1712 and output as 1712A skew performance and communicated to either local nodes or to centralized controller. Skew data can be stored as a new variable, or object, in the Link Stated Advisory ("LSA") table, for consideration in choosing a communication path in the network. Output 1712A appears as an input to process flowchart 1800 in FIG. 8.

If diversity of communication paths exists 1720, in terms of carrier wavelengths, OCG groups, physical routing on nodes or fibers, etc., then in step 1720A, a new route is selected and is evaluated using the marker at step 1706 onward. In this manner, the combinations and permutations of communication paths available in the communication network can be tested and evaluated for future use. The test process 1700 can be repeated at timely intervals, such as programmed maintenance ("PM"), existing downtime, or as interleaved with revenue traffic on the network, as resources permit, especially during low traffic periods. If an update provides a substantial change in the skew performance, notices or interrupt signals may be generated and forwarded to appropriate users, controllers, for remedial management of the network.

Figure 8:
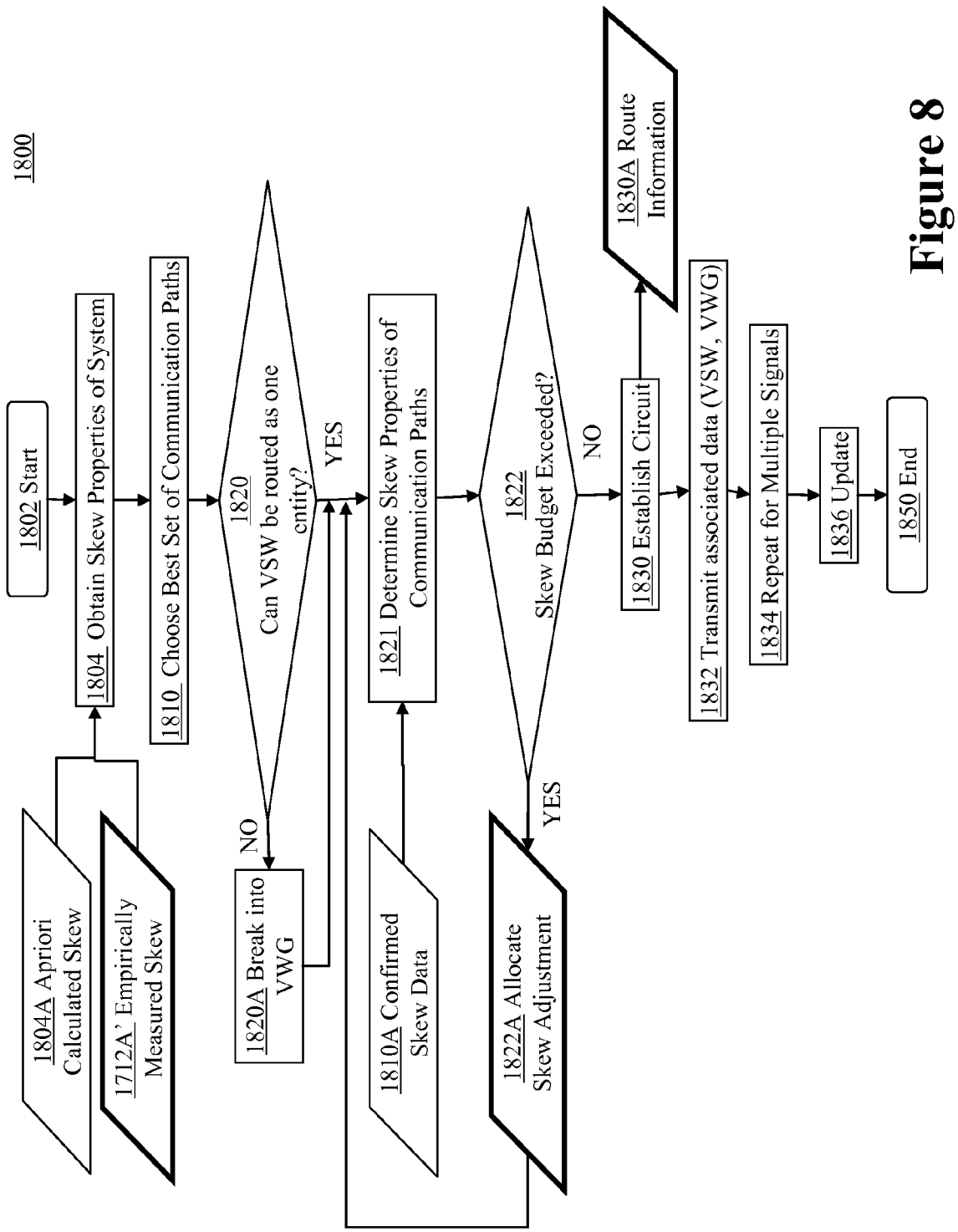
FIG. 8 is a flowchart of a process to route information via one of multiple communication paths in a communication network while considering the skew of the path, in accordance with various aspects of the present invention.

Referring now to FIG. 8 a flowchart 1800 of a process, independent of structure, is illustrated to route information via one of multiple communication paths in a communication network while considering the skew of the path in accordance with various aspects of the present invention. The initialization process allows a network to have greater efficiency, flexibility, and performance over the prior art networks that do not account for skew in a VSW signal, having correlated data transferred in parallel over multiple channels. The flowchart of FIG. 8 may be applied to any of the hardware or architecture embodiments illustrated in the figures herein, or to other systems known to those of skill in the art, for which skew adjustment is appropriate.

In some embodiments, an initializing process is accomplished 1800 by modifying standard Link Stated Advisory ("LSA") objects as part of a standard Open Shortest Path First ("OSPF") protocol to accommodate skew data. The LSA uses performance parameters to select routes for data signals.

The skew properties of the system are obtained 1804 either globally or local to a path(s). The skew properties are obtained in certain embodiments via apriori calculated skew input 1804A or empirically measured input, such as those calculated in step 1712A. For input 1804A, the skew is theoretically calculated via known fiber materials in the network, and the associated optical properties with that fiber material, the optical properties of the optical portions of the node, and the theoretical signal propagation through the electronic portion of the node. Theoretical skew calculations can be stored as discrete values for each segment or component in the network, then cumulatively summed for a given path selection from a lookup table in memory of a central controller, distributed controllers, or combination thereof. To further improve reliability, statistical process control ("SPC") can be implemented to ensure a greater probability of successful skew management in the network by considering worst case cumulative tolerances and performances by components in the communication path (for example considering multiple sigma deviations).

The skew properties of the system include information regarding nodes, fibers, etc., and the deskew properties of the system include the node deskew features (e.g., the electronic buffers as shown in FIG. 6A, and optical buffers in FIG. 6B), and the deskew fiber properties (as shown in FIG. 4C), and any other available deskew apparatus, such as wavelength swapping, as will be described in subsequent FIG. 7C flowchart. For example, the skew properties of fiber from node N5 to N3 vs. N5 to N6 to N3, e.g. with one common node, N5, and at least one non-common node, N6, can be considered as alternative routes. Similarly, skew properties of fibers with common nodes, such as that shown in FIG. 4C, can be considered for routing. Details associated with steps 1804 are provided in subsequent flowchart.

A best route is selected 1810, assuming nominal performance, from available communication paths in the network. In certain embodiments, the head end of the network selects the path(s) that routes the signal which will ensure the associations within the VWG are maintained in the routing through the network. In various embodiments, Multi-Protocol Label Switching ("MPLS") or Generalized MPLS ("GM-PLS") is used.

Various Quality of Service ("QoS") considerations may be manually provided 1810 by the user, or automatically by a controller. VSW may have higher priority to a given transmission path, than non-VSW (or single wavelength) signals. In this manner, the system can be manipulated to accommodate different signal needs with available system resources.

A first wavelength, $\lambda_1$, is selected and optimal route is chosen. A second wavelength, $\lambda_2$, is selected and the chosen route for $\lambda_1$ is selected. This process is repeated until all the wavelengths are accommodated. If all wavelengths cannot be accommodated in the chosen route, then a new route can be selected for $\lambda_1$, and the process repeated.

As an alternative to steps 1804 and 1810, skew properties of the system may be obtained and a path chosen based on the skew properties using real-time, on-the-fly implementation of skew adjustment. This skew adjustment may be implemented on an as-needed basis, using all available skew adjustment at each node, to ensure that the cumulative effect of skew from node to node does not accumulate beyond allowed spec. limits. In other words, as a client signal is propagated as associated data on an approximation of communication path characteristics in an attempt to reduce the possibility of exceeding the skew tolerance specification at the receiver.

Step 1820 inquires whether the VSW can be routed as one entity. This assumes that step 1810 has attempted all possible routing combinations between the source and destination of the given signal. If the VSW cannot be routed as a single entity, due to lack of available bandwidth, then the process proceeds to step 1820A. In step 1820A, the VSW is broken into two or more VWGs, each having one or more channels to carry portions of the client signal. Else, the process proceeds to step 1821.

The skew properties of the communication paths are confirmed for the anticipated transmission of the client data. A temporary circuit is established 1821 in which certain network resources are reserved for the expected transmission. However, if a client signal already transmitting on the system requires the resources, then it may trump the lower priority temporary circuit and essentially use the resources to ensure reliability of an already established communication link for the given client signal. If the skew can be confirmed on the chosen communication paths, then real-time measurement of the skew at the nodes for the chosen communication paths can be communicated to the controller in order to provide additional confidence that the chosen circuit has acceptable performance with skew, and other traditional networking metrics.

An analysis 1822 is performed to determine whether the skew budget has been exceeded for a given communication path selection without using any skew adjustment resources. In other words, rather than relying on simply using skew adjustment resources, such as skew buffers in the node, skew balancing techniques of wavelength swapping, route selection, are used that don't require utilization of skew adjustment buffers (electrical or optical). This hierarchy of skew adjustment reduces the load on network resources and improves performance relative to the network skew budget If the skew budget is exceeded for the best communication path, an alternative path may be selected and tested for compliance with the skew budget. Else, output 1822A allocation of skew adjustment resources is implemented, as described in subsequent process 1900 of FIG. 9.

If the chosen path of the VSW or the VWGs has accommodated the skew budget, then the circuit is established 1830 in the network, and transmission of data can begin. Output 1830A route information is provided to a central controller of at least one node within the communication path. Control signals are appropriately distributed to the network to enable the initiation of the transmission and confirmation of its successful implementation. If a distributed control is utilized, then the local node will communicate to an upstream node the route information it selected—a process that can be repeated at each new intermediate node until the circuit is completed at the destination node.

The associated data is transmitted 1832 as a virtual super wavelength ("VSW") or virtual wavelength groups ("VWGs") on the established circuit. The process 1800 of establishing routing for the plurality of communication paths can be repeated 1834 for other client signals added to, and/or dropped from, the network. In one embodiment, the establishment of a route can be executed on a round robin basis, a first-come-first-served basis, or on a holistic system-wide basis wherein the performance and the resources of the network are meted out to the competing client signals in a managed fashion. Information can be communicated over the network by circuit switching or packet switching.

While a circuit or path may be successfully established at the beginning of transmission, circumstances and performances may change with time or other variables, such as traffic load, optical and electrical interferences, temperature, physical changes, degradation of properties of the physical layer over time, changing priorities and qualities of service, etc. Consequently, an update of the skew measurements and route selection over time is provided 1836, and subsequent reprioritization, rerouting, and reestablishment of skew adjustment as would be required for a given carrier's goals of network management and quality of service. Updates can be performed during any convenient time periods, such as scheduled maintenance, low traffic time periods, etc. and at any frequency, e.g., seconds, minutes, hourly, etc. intervals.

Figure 9:
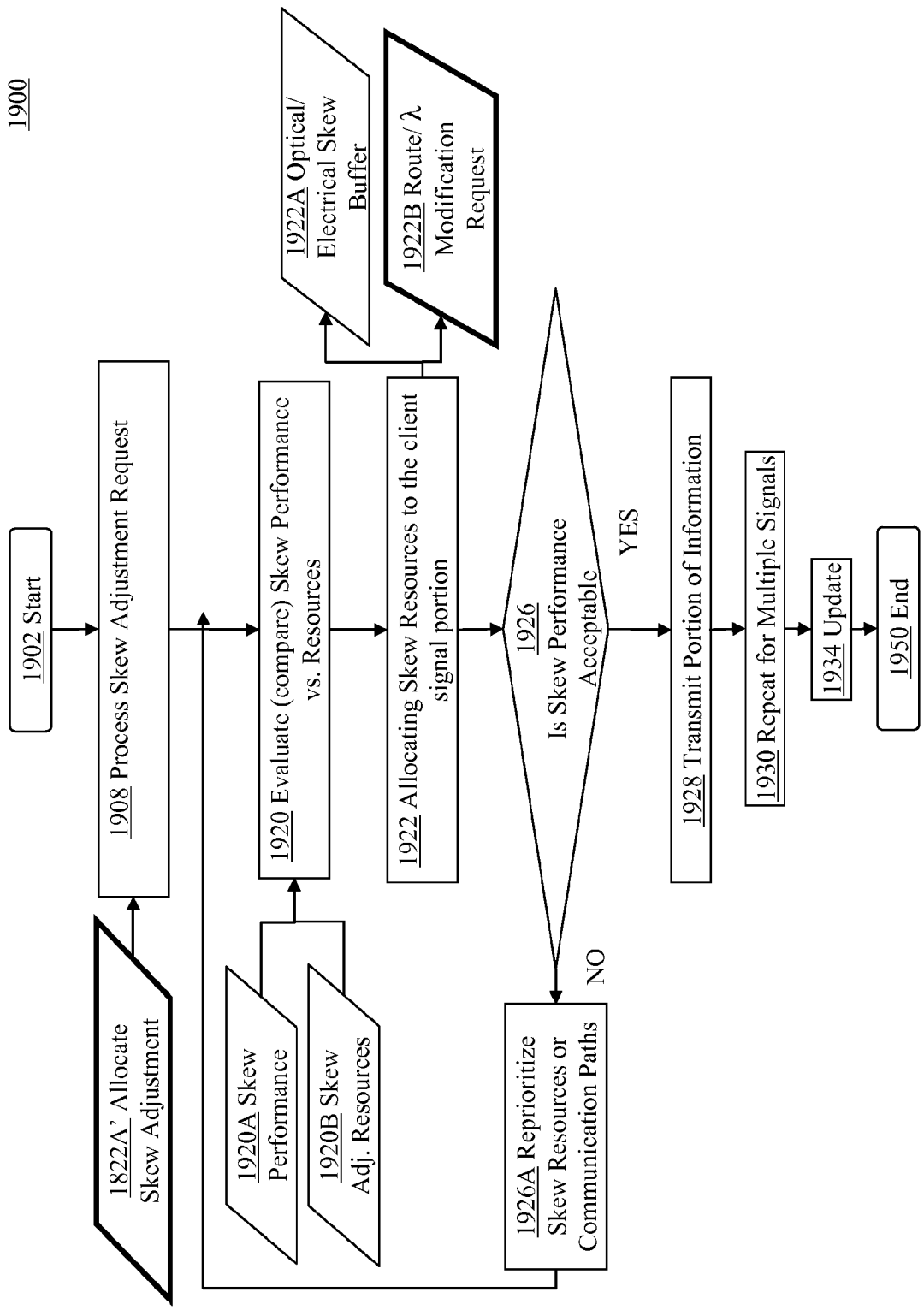
FIG. 9 is a flowchart of a process to provide skew adjustment for a communication path in a communication network, in accordance with various aspects of the present invention.

Referring now to FIG. 9, a flowchart 1900 of a process, independent of structure, is shown that provides skew adjustment for a communication path in a communication network in accordance with various aspects of the present invention. Implementation of process 1900 essentially means that utilization of existing routing solutions per process 1800 of FIG. 8 was unsuccessful in satisfying skew budget for a given client signal to be transmitted on the network. Consequently, utilization of skew adjustment resources within the network must now be considered if client signal is to be successfully routed on the network.

Skew adjustment request is processed 1908 as initiated by input 1822A' requesting same (see output 1822A from process 1800 in FIG. 8) for client information in a queue of requests to be transmitted on the network.

Skew performance input 1920A is received 1920 for the portion of information routed on a given communication path and receives skew adjustment resources input 1920B for the given communication paths. Input 1920A of skew performance can be the confirmed skew performance from step 1821 in prior process 1700 or can be estimated skew obtained in step 1804 in prior process 1800. Input 1920B can be provided from resource management lookup tables in central network management control or locally stored resource information.

The skew performance is evaluated 1920. Inputs 1920A of skew budget and 1920B skew adjustment resources is provided for evaluation in step 1920. Note also, that the skew performance for the portions of client signal on the newly chosen communication paths might deteriorate faster than the available of skew adjustment resources ameliorate. In this case, an existing circuit might be targeted for the new communication paths, or priorities in the network rearranged in the ongoing iterative approach to resource management of the network.

Skew resources are allocated to the client signal portion of information to be transmitted. Step 1922 is implemented as output 1922A reserves adjustable skew resources (optical and/or electrical), and as output 1922B reserves wavelength ($\lambda$) reassignment portions of the network, in anticipation of both outputs being evaluated by subsequent steps. In addition to skew adjustment made at the source node and a destination node, further skew adjustments can be implemented anywhere along the communication path for the client signal portion, e.g., at one or more intermediate nodes and spans.

An inquiry determines 1926 whether the skew performance is acceptable. If the skew performance is not acceptable, the step 1926A reprioritizes skew resources or communication paths to accommodate the signal. Thereafter, process 1900 repeats from step 1920 onwards. Note that if process 1900 cannot successfully provide skew resources for information to be transmitted on the network with acceptable skew performance, an interrupt or an error message can be generated and provided to the system user/administrator.

If skew adjustment resources are not available on communication path chosen in process 1800, the skew adjustment resources may be found in new communication paths. By confirming the existing or newly selected communication paths have available skew adjustment resources, process 1900 can continue to the next step of evaluating the resources available versus the skew adjustment needed for the client signal.

If the skew performance is acceptable, after considering communication routes and skew adjustment resources, then step 1928 is executed. In step 1928, the portion of the information to be transmitted on the allocated communication path is executed after the circuit has been established.

The aforementioned steps may be repeated 1930 for each of multiple signals or portions of information that comprise the given client data, such as the associated data. Thus, process 1900 is an ongoing iterative approach for a given client signal as well as for multiple client signals, all fighting for finite system resources. By providing the iterative approach with many options for skew management in the present invention, the overall system can be optimized.

An update is provided 1934 of the current status of skew adjustment settings and resources in the system to determine even if the system is static. This step accommodates unforeseen changes in system performance and ensures reliable network operation.

Figure 10:
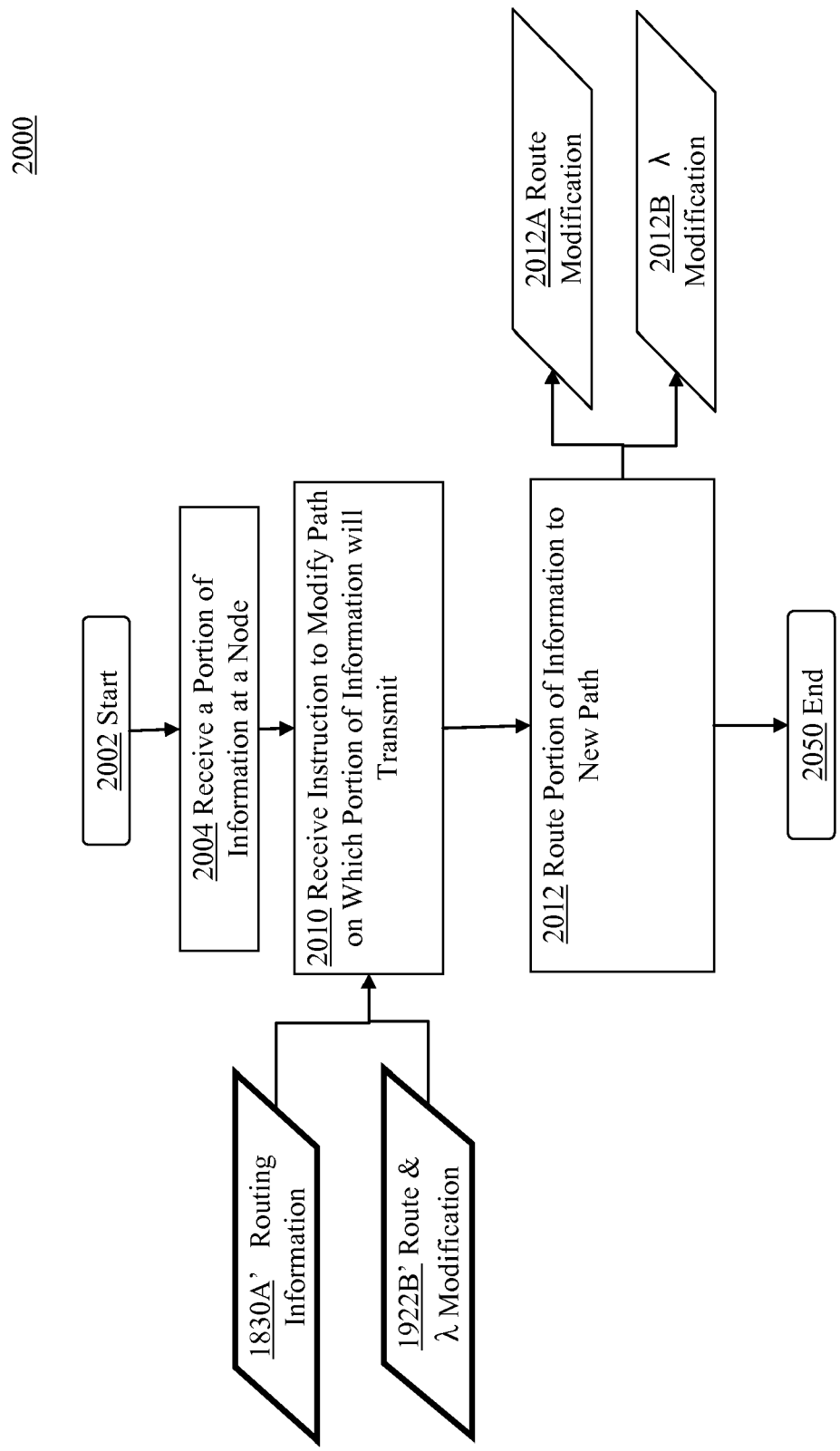
FIG. 10 is a flowchart of a process to modify path route in terms of spatial diversity or wavelength diversity within a communication network, in accordance with various aspects of the present invention.

Referring now to FIG. 10, a flowchart is shown of a process, independent of structure, to modify path route in terms of spatial diversity or wavelength diversity within a communication network in accordance with various aspects of the present invention.

A portion of information is received 2004 at a node and undergoes an optical-to-electrical-to-optical conversion. An instruction is received 2010 to modify the path on which the portion of information will transmit. The communication of a request for route modification is shown as input 1830A' and input 1922B'. If wavelengths within a given VWG are simply swapped, then the resources are already reserved and an evolution of resources is not necessary. However, if a desired target wavelength reassignment is not a wavelength in the OCG in which an associated communication path exists for the given client, then an evaluation is necessary for the targeted communication path client signal and the effect the wavelength reassignment will have on its skew budget.

The portion of the information is routed 2012, or switched to the new path, and as represented by either or both outputs 2012A, route modification or output 2012B wavelength modification. Wavelength reassignment can occur at any time during the real-time operation of the portions of the client signal through the existing communication paths, so long as synchronization is effective, and overbooking of a given communication path does not arise.

A. High Data-Rate, Trans-Oceanic Optical System

Various embodiments of the invention may be applied to submarine optical systems, some of which may be used as trans-oceanic optical networks that connect terrestrial systems across a large body of water. One skilled in the art will recognize that the length in which an optical signal travels on these trans-oceanic systems presents diverse engineering issues including both dispersion and skew compensation. These issues are further complicated as the data rate of a client signal increases and the total number of channels on which a signal is transmitted expands. One skilled in the art will recognize that the following discussion, although described in relation to a trans-oceanic optical system, may be applied to any type of networking system in which skew and latency management are relevant, such as long-haul terrestrial optical systems.

Figure 11:
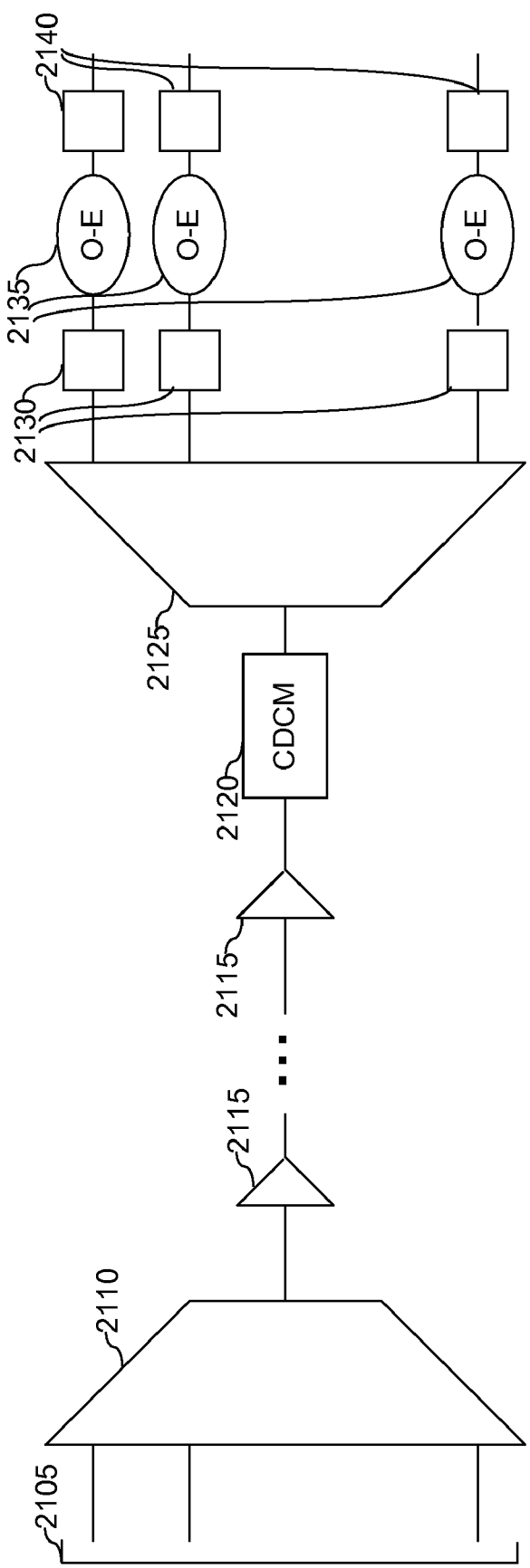
FIG. 11 is an optical system having both dispersion compensating elements and skew compensating elements according to various embodiments of the present invention.

FIG. 11 illustrates generally a system in which both dispersion and skew post-compensation are performed at a receiver side of an optical system according to various embodiments of the invention. It is important to note that the skew management functions and structures previously described-above may be employed within this network at various locations. For example, the network may be installed, configured and managed at transmission nodes, intermediary nodes and/or receiver nodes to improve the differential latency between channels within the system.

On the transmission side of the system, a plurality of channels 2105 is optically multiplexed, via multiplexer 2110, to generate a WDM signal. The WDM signal is communicated along the optical span having multiple optical amplifiers or regenerators 2115 that keep the WDM signal power within a preferred range. A coarse dispersion compensation module 2120 is coupled to receive the WDM signal after having traversed all or substantially all of the optical span. The coarse dispersion compensation module 2120 compensates for dispersion effects on the WDM signal along the span, which causes signal degradation. In various embodiments of the invention, the coarse dispersion compensation module 2120 comprises dispersion compensating fiber or fibers that reduce the dispersive characteristics of the WDM signal. As the WDM travels through these dispersion compensating fiber (s), the shape of the signal is improved resulting in a better signal-to-noise ratio.

One skilled in the art will recognize that various compensating systems may be realized with different types and combinations of dispersion compensating fibers. Because the coarse dispersion compensation module 2120 compensates for dispersion across the channels of the WDM signal (i.e., the WDM signal is multiplexed), targeting certain channels within the WDM signal for dispersion compensation is difficult. Accordingly, certain embodiments of the invention provide for additional fine dispersion compensation at a channel granularity.

An optical demultiplexer 2125 separates the WDM signal into individual channels, optical signal groups, or a combination thereof. A plurality of fine dispersion compensation modules 2130 receive optical channels or optical signal groups and further apply dispersion compensation thereon. In certain embodiments of the invention, each fine dispersion compensation module 2130 is designed to compensate a certain channel or group of channels. Dispersion compensation fiber may be used within the plurality of fine dispersion compensation modules 2130.

The coarse dispersion compensation module 2120 and the fine dispersion compensation module 2130 introduce additional latency within the WDM signal. These latency effects become even more detrimental when the added latency is not spread evenly across each of the channels. In such situations, this uneven addition of latency further increases the amount of skew between one or more of the channels resulting in a more complex and demanding reassembly procedure if not address prior thereto.

Each of the dispersion compensated channels is converted into the electrical domain by a plurality of optical-to-electrical converters 2135. These converters 2135 may include PIN diodes, photoavalanche diodes, or other converters known to one of skill the art. The resulting electrical signals are provided to a plurality of skew compensating modules 2140 that adjust the differential latency between the channels so that a signal, transmitted across at least two of the channels, may be more efficiently rebuilt. This skew compensation may be achieved by effectively introducing additional latency within one or more of the channels by performing a post-buffering operation thereon. One skilled in the art will recognize that the buffer size in each of the skew compensating modules 2140 may be adjusted to enable compensation of more or less skew.

As previously discussed, skew is potentially introduced into a client signal as the channels within the WDM signal travel across the optical span and are processed within dispersion compensation modules (e.g., 2120, 2130). This skew may be compensated on the transmission side of the optical signal by pre-buffering one or more of the channels within the WDM signal, by buffering one or more of the channels within the WDM signal at an intermediary node, or post-buffering one or more of the channels at the skew compensating modules 2140, or any combination thereof. According to various embodiments of the invention, the skew compensating modules 2140 may also provide skew analysis functionality in which skew across the channels is monitored. If the skew falls outside of a desired range, a skew compensating module 2140 may generate an alarm and/or dynamically re-allocate the channels to improve the skew. Furthermore, as detailed in FIG. 12, the skew compensating modules 2140 may also be divided into coarse and fine skew compensating modules.

Although skew compensation has been described as being performed in the electrical domain, one skilled in the art will recognize that skew compensation may also be done in the optical domain. For example, additional latency may be added to one or more channels by using an optical buffer, such as a fiber coil, to add this latency.

Figure 12:
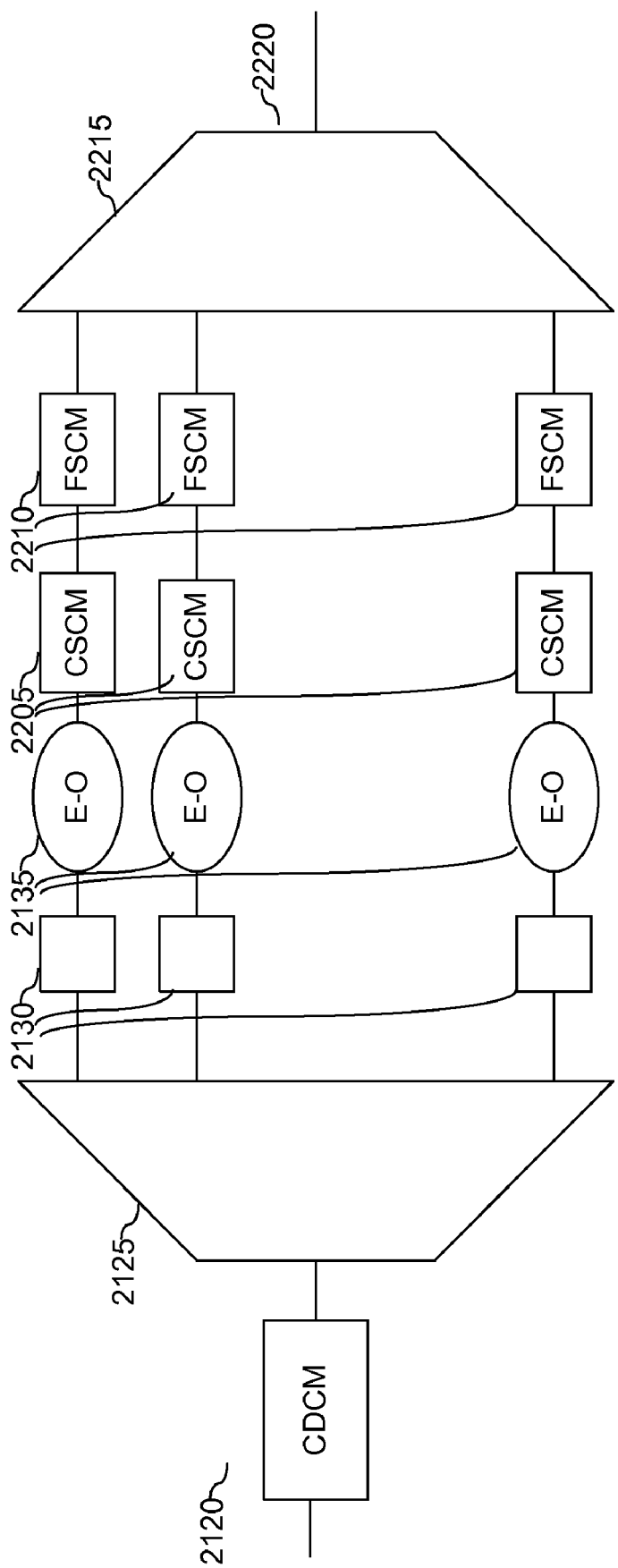
FIG. 12 is an optical receiver system in which dispersion and skew compensation is performed according to various embodiments of the present invention.

FIG. 12 illustrates a more detailed diagram of a receiver node within a trans-oceanic optical system according to various embodiments of the invention. The node comprises a coarse dispersion compensation module 2120 that compensates dispersion across the WDM signal as previously discussed. An optical demultiplexer 2125 optically separates the WDM signal into individual channels or optical signal groups, after which a plurality of fine dispersion compensation modules refine the dispersion compensation at a finer granularity. After being converted into electrical channels by converters 2135, the skew across the electrical channels is first coarsely adjusted and then finely adjusted.

In various embodiments of the invention, the electrical channels are provided to a plurality of coarse skew compensating modules 2205. These modules 2205 provide a coarse adjustment of differential latency between at least two of the electrical channels. This reduction of differential latency may be achieved by buffering one or more of the electrical channels for a set period of time, which effectively reduces the corresponding skew or differential latency between the electrical channels. A plurality of fine skew compensating modules 2210 further refines the skew compensation across certain channels. In certain embodiments of the invention, the plurality of fine skew compensating modules 2210 analyze certain skew characteristics remaining after the coarse skew adjustment and further adjust the channels to further improve the corresponding skew. One skilled in the art will recognize that either or both of the coarse skew compensating modules 2210 and the fine skew compensating modules 2215 may be integrated with other electrical components within the node. For example, the fine skew compensating modules 2215 may be integrated within an electrical multiplexer 2215 that combines one or more electrical channels into a client signal.

Further electrical components or modules may be provided within the signal paths that analyze, modify or otherwise process these compensated electrical channels. These electrical components may or may not be located between the coarse skew compensating modules 2210 and the fine skew compensating modules 2215.

Using the compensated electrical signals, a client signal 2220 is transmitted from the electrical multiplexer 2215 and is generated by combining one or more of the electrical signals into a relatively higher data rate signal. This combination of electrical signals is less demanding if there is little or no skew between its component electrical channels.

Figure 13:
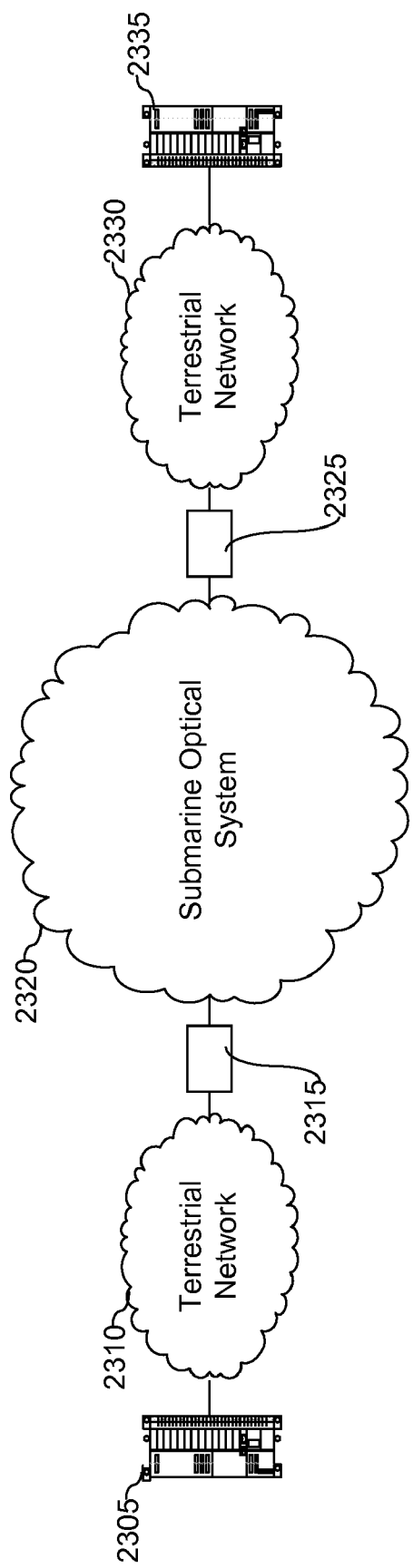
FIG. 13 is an optical system comprising both terrestrial and submarine optical networks according to various embodiments of the present invention.

FIG. 13 illustrates an exemplary multi-network, trans-oceanic optical system in which skew compensation is realized at various locations along the signal path including pre-compensation, intermediary compensation, and post-compensation. In addition, the location and frequency of skew compensation modules may depend on the number and diversity of the service providers involved in the multi-network trans-oceanic system.

Referring to FIG. 13, a transmitting node 2305 transmits and/or receives information from a first terrestrial network 2310. A first landing node 2315 interfaces the first terrestrial network 2310 with a submarine optical system 2320. A second landing node 2325 interfaces the submarine optical system 2320 with a second terrestrial network 2330, which is connected to a receiver node 2335. In this type of system, skew compensation may be realized at various locations including the transmitting node 2305, the first landing node 2315, the second landing node 2325, and the receiver node 2335.

In various embodiments of the invention, pre-skew compensation is performed exclusively on the transmitting node 2305, which compensates for skew across the first terrestrial network 2310, the submarine optical system 2320, and the second terrestrial network 2330. These embodiments may be more typical if a service provider is using a third-party submarine optical system to inter-connect terrestrial networks and does not have control of the landing nodes of the submarine optical system.

In other embodiments, skew compensation may be diversified throughout the system in which the first and/or second landing nodes 2315, 2325 further comprise skew compensation modules. Such a diversification allows a relatively lower amount of pre-compensation to be performed on the transmitting node 2305 and a relatively lower amount of post-compensation to be performed on the receiver node 2335. Additionally, this diversification may also provide early fault or error detection if skew becomes too large at some point within the system.

Figure 14:
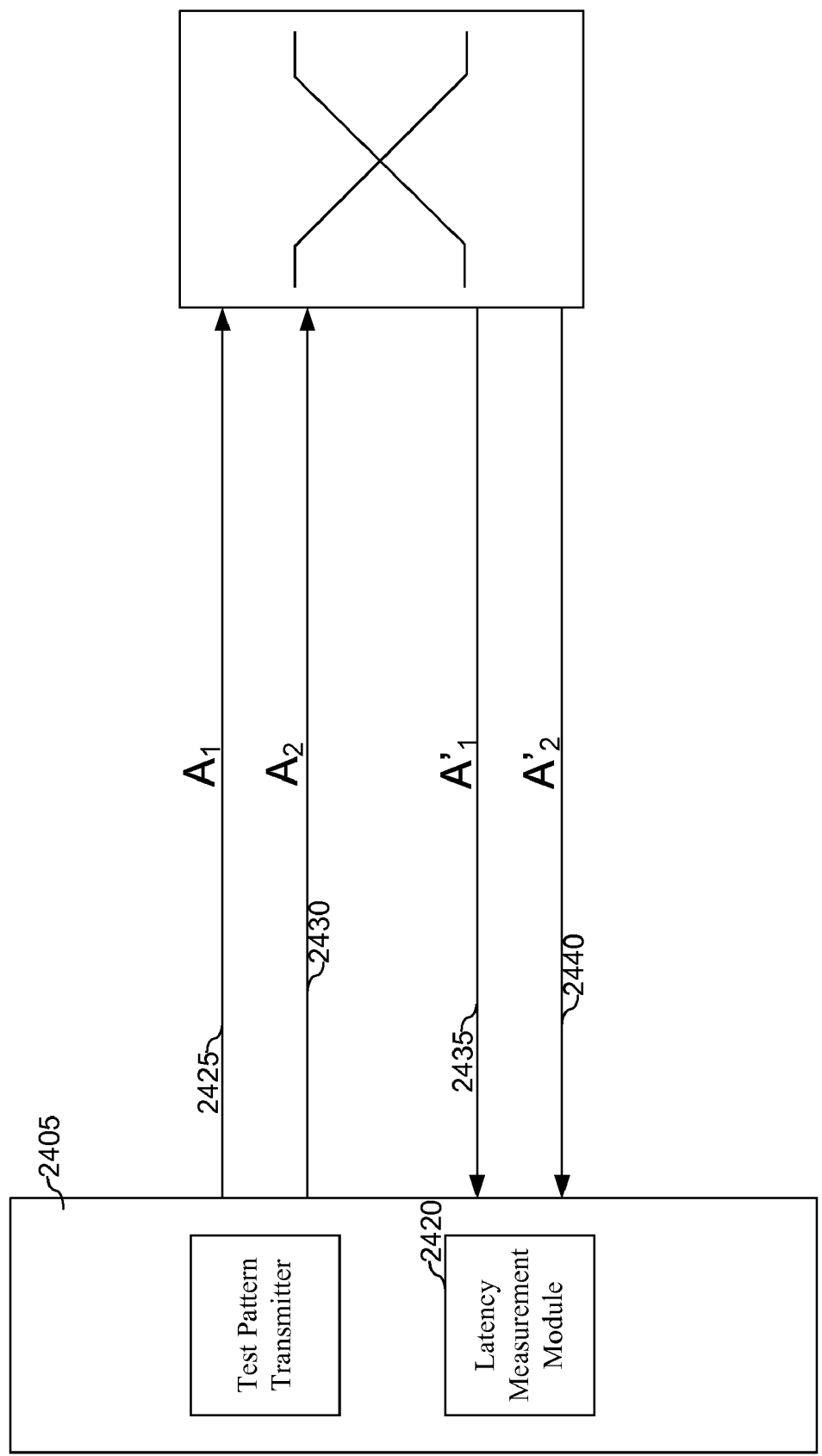
FIG. 14 is a latency testing system in which latency on independent paths is determined according to various embodiments of the present invention.

FIG. 14 illustrates a method for determining latency along both transmitting and receiving paths of a network system, such as a submarine optical system, according to various embodiments of the invention. In particular, the method allows for a single transmitting device to determine distinct latencies on both transmitter and receiver-side paths without requiring a terminating node on the other side of the connection. In various embodiments of the invention, a switch is used, in lieu of such a terminating node, at the other side of the paths that switches test signals on various receiver-side paths.

A transmitting node 2405 comprises a test pattern transmitter 2410 and a latency measurement module 2420. The test pattern transmitter 2410 generates a test pattern such as a test frame or frames. The test pattern is independently transmitted on a first channel $A_1$ 2425 and a second channel $A_2$ 2430. These channels 2425, 2430 comprise transmitter-side paths that may be found within a submarine optical system.

The test pattern(s) on the two channels are received at a switch 2445 and switched on one of a diverse number of receiver side paths or channels. In this particular example, two receiver-side channels $A'_1$ 2435 and $A'_2$ 2440 are available and may be found within the submarine optical system. The latency measurement module 2420 receives the test pattern(s) and calculates a round-trip latency based on the time of which the pattern(s) were transmitted by the test pattern transmitter 2410.

In order to determine the latency on each of the four channels 2425, 2430, 2435, 2440, a series of test pattern transmission steps are performed to determine the round-trip latency of the four distinct paths. In particular, a first test pattern transmission is sent via links $A_1$ 2425 and $A'_1$ 2435; a second test pattern transmission is sent via links $A_1$ 2425 and $A'_2$ 2440; a third test pattern transmission is sent via links $A_2$ 2430 and $A'_1$ 2435; and a fourth test pattern transmission is sent via links $A_2$ 2430 and $A'_2$ 2440.

Using the four resulting equations (i.e., the total latency of the test pattern transmission being equal to the sum of the two paths in the transmission), the distinct latency of the four paths or channels may be calculated. For example, the distinct latencies may be solved as follows:

$$A_1 + A'_1 = B_{11}$$

$$A_2 + A'_2 = B_{22}$$

$$A_1 + A'_2 = B_{12}$$

$$A_2 + A'_1 = B_{21}$$

Where $B_{11} - B_{22} = \Delta 1$ and $B_{12} - B_{21} = \Delta 2$
The distinct latencies may be solved according to:

$$A_1 - A_2 = \frac{1}{2}(\Delta 1 + \Delta 2)$$

$$A'_1 + A'_2 = \frac{1}{2}(\Delta 1 - \Delta 2)$$

In certain embodiments, the latency across the switch 2445 is negligible and may be ignored in these calculations. In other embodiments, the latency across the switch 2445 is constant and known, so that the latency values may still be calculated.

One skilled in the art will recognize that the above-described method for calculating latency across diverse paths may be applied to any number of paths greater than two. Additionally, the method may be applied to any type of network including, but not limited to, submarine, trans-oceanic optical systems.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications, combinations, permutations, and variations as may fall within the spirit and scope of the appended claims.

We claim:

1. A networking system for reducing skew across a plurality of channels, the system comprising:
    a transmission node, coupled to receive a first signal, that transmits the first signal on the plurality of channels;
    a first path that transports at least one first channel, in the plurality of channels, on which a first portion of the first signal is communicated;
    a second path that transports at least one second channel, in the plurality of channels, on which a second portion of the first signal is communicated;
    a controller, coupled within the networking system, that controls transportation of the first signal across the plurality of channels relative to the skew characteristics of the plurality of channels; and
    a receiver node that receives the first and second portions of the first signal and reassembles the first and second portions of the first signal.

2. The networking system of claim 1 wherein the transmission node controls the transmission of the first signal across the plurality of channels using theoretical skew calculations performed within the transmission node.

3. The networking system of claim 1 wherein the transmission node controls the transmission of the first signal across the plurality of channels using empirically measured network characteristics from the first path and the second path.

4. The networking system of claim 3 wherein the empirically measure network characteristics comprise at least one characteristic selected from a group consisting of: path latency, skew slope, signal dispersion, fiber dispersion, and differential latency between wavelength carriers.

5. The networking system of claim 1 further comprising at least one intermediary node, within the first path, which introduces latency on the at least one first channel and wherein the transmission node causes a delay in the transmission of the at least one second channel to improve relative skew of the first signal.

6. The networking system of claim 5 wherein the at least one first channel is wavelength swapped on the at least one intermediary node.

7. The networking system of claim 6 wherein the wavelength swapped at least one first channel undergoes an optical signal wavelength conversion that reassigns a signal portion on the at least one first channel to a different wavelength.

8. The networking system of claim 1 wherein the skew characteristics comprise a preskew dispersion slope that relates skew across the plurality of channels relative to a delay applied to the at least one second channel.

9. The networking system of claim 1 wherein the first signal is transported across a network as a virtual super wavelength signal.

10. The network system of claim 1 wherein the first signal is transported across a network as a plurality of virtual super groups.

11. The networking system of claim 1 wherein the first channel is transported on a first fiber having a first latency characteristic and the second channel is transported on a second fiber having a second latency characteristic, wherein the first and second latency characteristics are different.

12. The networking system of claim 1 wherein the at least one first channel comprises a first a set of wavelengths, each having skew below a first threshold, and the at least one second channel comprises a second set of wavelength, each having skew below a second threshold.

13. The networking system of claim 1 further comprising an off-frequency converter, coupled in an intermediary node within the first path, that optically converts the at least one first channel from the first path to another channel.

14. The networking system of claim 13 further comprising a planar lightwave circuit, coupled within the off-frequency converter, that converts, within the optical domain, between the first channel and the another channel.

15. A transceiver that provides skew adjustment across a plurality of wavelengths, the transceiver comprising:
    an input on which a client signal is received;
    a deinterleaver, coupled to the input, that partitions the client signal into a first signal portion and a second signal portion;
    a plurality of skew buffers, coupled to store the first and second signal portions in order to introduce a delay on the first signal portion;
    a plurality of optical conversion elements, coupled to the plurality of skew buffers, that converts the first signal portion into a first optical signal portion and the second signal portion into a second optical signal portion;
    a plurality of optical skew compensators, coupled to the plurality of optical conversion elements, that optically compensate for skew between the first optical signal portion and the second signal portion caused by transportation across a network; and
    a controller, coupled to the plurality of skew buffers and plurality of optical skew compensators, that receives information about skew properties of a network and adjusts the plurality of skew buffers and plurality of optical skew compensators relative to the information.

16. The transceiver of claim 15 wherein the information received by the controller comprises theoretical skew calculations of a plurality of paths through the network.

17. The transceiver of claim 15 wherein the information received by the controller comprises empirically measured network characteristics of a plurality of paths through the network.

18. The transceiver of claim 17 further comprising a programmable skew measurement module, coupled to the plurality of optical conversion elements and the controller, that provides test signals used to generate the empirically measure network characteristics of the plurality of paths.

19. The transceiver of claim 18 wherein the programmable skew measurement module comprises a comparator that correlates a test pattern to a marker generated from transmission of the test pattern on at least one path within the network.

20. The transceiver of claim 15 further comprising an optical multiplexer, coupled to the plurality of optical skew compensators, that combines the first optical signal portion and the second signal portion into a wavelength division multiplexed signal.

21. The transceiver of claim 15 further comprising a cross-connect switch that communicatively couples the input to a plurality of ports on the transceiver.

22. The transceiver of claim 15 wherein the first signal portion and the second signal portion are transported on the network as a virtual super wavelength, having a plurality of wavelengths, on a single optical fiber.

23. The transceiver of claim 15 wherein the first signal portion and the second signal portion are transported on the network as a plurality of super wavelength groups on a plurality of optical fibers.

24. The transceiver of claim 15 wherein the controller interfaces with the network on an optical supervisory channel and transmits a test pattern on the network to generate a representation of skew characteristics of at least one path on the network.

25. The transceiver of claim 24 wherein the at least one path on the network comprises an intermediary node that receives, processes and updates the test pattern to provide additional information about the skew characteristics of the at least one path on the network.

26. The transceiver of claim 24 wherein the plurality of optical conversion elements and the plurality of optical skew compensators are integrated on a single semiconductor substrate.

27. A method for adjusting transportation of a client signal to at least partially compensate for skew across a plurality of channels, the method comprising:
generating a bit pattern marker for testing skew on a plurality of communication path wavelengths;
transmitting the bit pattern marker on the plurality of communication path wavelengths;
receiving the bit pattern marker from the plurality of communication path wavelengths;
analyzing the received bit pattern marker to identify if skew characteristics across the plurality communication path wavelengths;
selecting a preferred first set of communication path wavelengths that provides skew properties below a skew budget threshold; and
transmitting the client signal on the preferred first set of communication path wavelengths.

28. The method of claim 27 further comprising:
partitioning the client signal into a first signal portion and a second signal portion;
transmitting the first signal portion on a first optical signal group, within the plurality of communication path wavelengths, on a first optical fiber; and
transmitting the second signal portion a second optical signal group, within the plurality of communication path wavelengths, on a second optical fiber; and
wherein the skew between first signal portion and the second signal portion is reduced by the selection of at least one wavelength within the first and second optical signal groups.

29. The method of claim 28 wherein the first and second optical fibers are the same optical fiber.

30. The method of claim 28 wherein the first and second optical fibers are different optical fibers.

31. The method of claim 28 further comprising the steps of:
receiving a skew adjustment request after transmitting the client signal on the preferred first set of communication path wavelengths;
evaluating skew performance of the preferred first set of communication path wavelengths to a skew budget;
adjusting an allocation of the first and second signal portions across the preferred first set of communication path wavelengths to reduce the skew performance below the skew budget; and
transmitting the first and second signal portions across the adjusted allocation of the preferred first set of communication path wavelengths.

32. The method of claim 31 wherein a delay is introduced on the first signal portion to improve the skew performance of the allocated preferred first set of communication path wavelengths.

33. The method of claim 31 wherein data on at least one wavelength within the preferred first set of communication path wavelengths is reassigned to a different wavelength to reduce the skew performance.

34. The method of claim 31 further comprising the step of off-frequency converting data on at least one wavelength within the preferred first set of communication path wavelengths is reassigned to a different wavelength on an intermediary node.

35. The method of claim 34 wherein the off-frequency conversion occurs within a single optical signal group.

36. The method of claim 27 further comprising the step of approximating skew properties between the first signal portion and the second signal portion are apriori estimated across the preferred set of communication path wavelengths.

37. The method of claim 27 wherein the received bit pattern is compared to a skew budget to select the preferred first set of communication path wavelengths.

38. The method of claim 27 further comprising the steps of:
receiving the first signal portion on a first intermediary node within a first signal path within the preferred set of communication path wavelengths;
receiving an instruction to modify a path on which the first signal portion is to be routed; and
routing the first signal portion on a new path in response to the instruction.

39. The method of claim 38 wherein the new path is a physical path within the preferred set of communication path wavelengths.

40. The method of claim 38 wherein the new path is a physical path outside of the preferred set of communication path wavelengths.

41. A method for adjusting transportation of a client signal to at least partially compensate for skew across a plurality of channels, the method comprising:
partitioning the client signal into a first signal portion and a second signal portion;

transmitting the first signal portion on a first optical signal group, within the plurality of communication path wavelengths; and transmitting the second signal portion a second optical signal group, within the plurality of communication path wavelengths; and wherein the skew between first signal portion and the second signal portion is reduced by the selection of at least one wavelength within the first and second optical signal groups.

* * * * *